US012634544B2

(12) United States Patent (10) Patent No.: US 12,634,544 B2
Miura et al. (45) Date of Patent: May 19, 2026

(54) VEHICLE CONTROL SYSTEM AND VEHICLE CONTROL METHOD

(71) Applicant: SONY GROUP CORPORATION, Tokyo (JP)

(72) Inventors: Koji Miura, Tokyo (JP); Hiroshi Imamura, Tokyo (JP); Mikinori Matsuda, Tokyo (JP); Kenta Miyakawa, Tokyo (JP); Toru Nagara, Tokyo (JP); Tsuyoshi Kagoya, Tokyo (JP); Koji Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 85 days.

(21) Appl. No.: 18/687,506

(22) PCT Filed: Feb. 16, 2022

(86) PCT No.: PCT/JP2022/006036
§ 371 (c)(1),
(2) Date: Feb. 28, 2024

(87) PCT Pub. No.: WO2023/042418
PCT Pub. Date: Mar. 23, 2023

(65) Prior Publication Data
US 2024/0388758 A1     Nov. 21, 2024

(30) Foreign Application Priority Data

Sep. 15, 2021     (JP) ................................. 2021-150607

(51) Int. Cl.
*H04N 21/414*          (2011.01)
*H04N 21/431*          (2011.01)
(Continued)

(52) U.S. Cl.
CPC ... *H04N 21/41422* (2013.01); *H04N 21/4316* (2013.01); *H04N 21/44218* (2013.01); *H04N 21/4882* (2013.01)

(58) Field of Classification Search
None
See application file for complete search history.

(56) References Cited

U.S. PATENT DOCUMENTS 9,751,463 B1*    9/2017    Ramcharitar .......... G08G 1/052
11,029,837 B2*    6/2021    Bandishti ............... B60K 35/22
(Continued)

FOREIGN PATENT DOCUMENTS

DE        102016218602 A1      3/2018
JP           2017-174043 A      9/2017
(Continued)

OTHER PUBLICATIONS

International Search Report and Written Opinion of PCT Application No. PCT/JP2022/006036, issued on May 10, 2022, 09 pages of ISRWO.

*Primary Examiner* — Alexander Q Huerta
(74) *Attorney, Agent, or Firm* — CHIP LAW GROUP

(57) ABSTRACT

Provided is a vehicle control system that includes a human-machine interface. The human-machine interface performs display control of entertainment content (CT) on the basis of a monitoring result of a passenger (PA) and changes a display area of a portion into a transparent state based on the performed display control of the entertainment content.

11 Claims, 19 Drawing Sheets

(51) Int. Cl.
    *H04N 21/442*        (2011.01)
    *H04N 21/488*        (2011.01)

(56)                    References Cited

U.S. PATENT DOCUMENTS

| | | | |
|---|---|---|---|
| 2011/0093165 A1* | 4/2011 | Miller | B60R 22/48 |
| | | | 701/36 |
| 2014/0015971 A1* | 1/2014 | DeJuliis | A61B 5/02055 |
| | | | 348/148 |
| 2017/0253122 A1* | 9/2017 | Jun | B60K 35/81 |
| 2018/0334175 A1* | 11/2018 | Boule | B60W 40/08 |
| 2019/0204827 A1* | 7/2019 | Bhalla | G05D 1/0061 |
| 2019/0340925 A1* | 11/2019 | Cansino | H04N 21/2146 |
| 2020/0331486 A1* | 10/2020 | Wieczorek | G06V 40/161 |
| 2021/0271365 A1 | 9/2021 | Bandishti | |
| 2024/0335738 A1* | 10/2024 | Lake-Schaal | A63F 13/795 |

FOREIGN PATENT DOCUMENTS

| | | |
|---|---|---|
| JP | 2019-133260 A | 8/2019 |
| JP | 2019-135614 A | 8/2019 |
| JP | 2020-098610 A | 6/2020 |
| JP | 2020-192877 A | 12/2020 |
| WO | WO-2020183893 A1 | 9/2020 |

* cited by examiner

| INFORMATION TRANSMISSION LEVEL | SURROUNDING ENVIRONMENT | DISPLAY METHOD |
|---|---|---|
| RANK S | ACCIDENT OCCURRING AHEAD | ·STOP VIEWING OF CONTENT<br>·SECURE FIELD OF VIEW OUTSIDE AND AHEAD OF VEHICLE<br>·DISPLAY WARNING INFORMATION |
| RANK A | ACCIDENT OCCURRING ON LEFT OR RIGHT SIDE | ·SECURE FIELD OF VIEW OUTSIDE VEHICLE ON NECESSARY SIDE<br>·MOVE CONTENT TO OPPOSITE SIDE<br>·DISPLAY WARNING INFORMATION |
| RANK B | THERE IS CAR AT SHORT DISTANCE | ·SECURE FIELD OF VIEW OUTSIDE VEHICLE IN NECESSARY DIRECTION<br>·MOVE CONTENT TO POSITION WHERE IT IS NOT OBSTRUCTING<br>·DISPLAY WARNING INFORMATION |
| RANK C | THERE IS CAR AT LONG DISTANCE | ·SECURE MODEST FIELD OF VIEW OUTSIDE VEHICLE IN NECESSARY DIRECTION<br>·DO NOT DISPLAY WARNING INFORMATION |
| RANK D | THERE IS NO CAR AROUND (NO INVENT TO ASSUME DANGER) | ·CONTINUE VIEWING OF CONTENT |

FIG.12

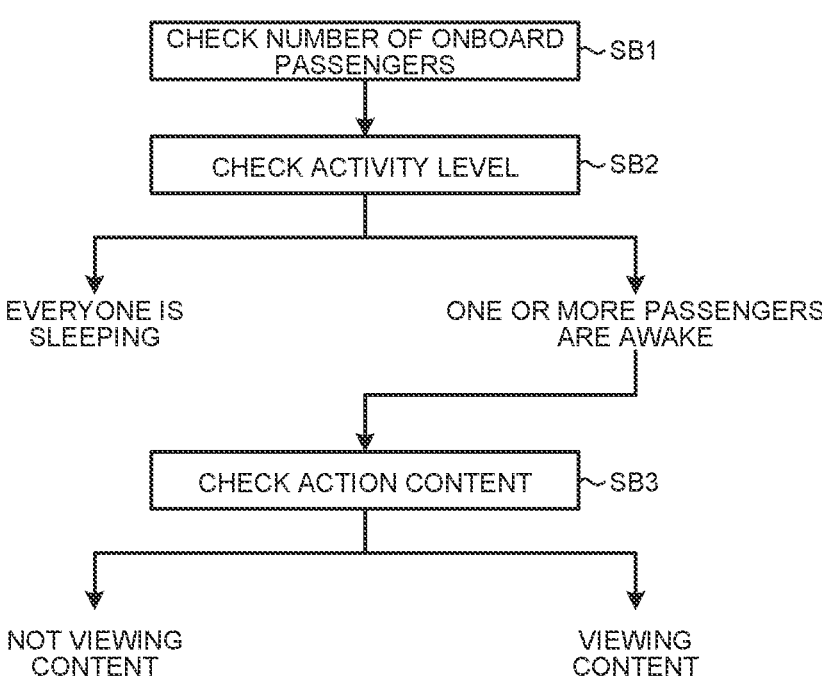

```
CHECK NUMBER OF ONBOARD
PASSENGERS                    ～SB1

↓

CHECK ACTIVITY LEVEL          ～SB2
```

EVERYONE IS                ONE OR MORE PASSENGERS
SLEEPING                        ARE AWAKE

```
CHECK ACTION CONTENT          ～SB3
```

NOT VIEWING                      VIEWING
CONTENT                          CONTENT

FIG.13

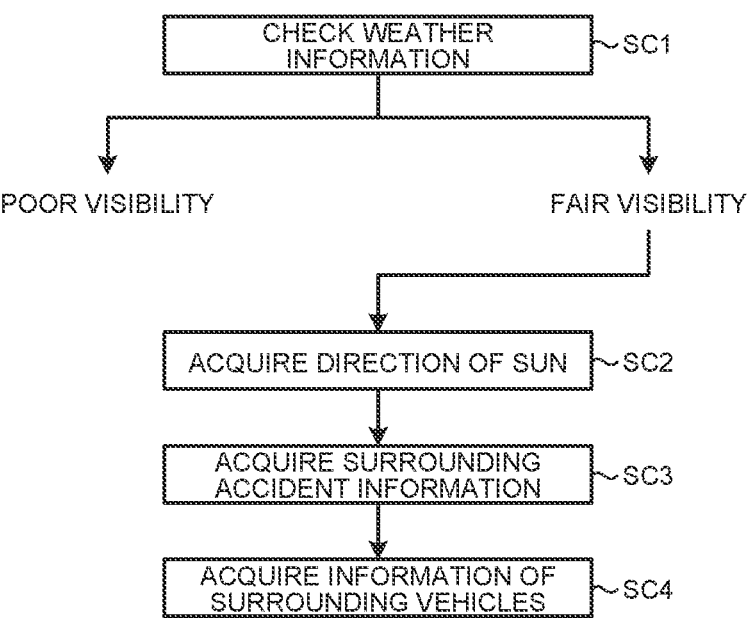

```
CHECK WEATHER
INFORMATION                   ～SC1
```

POOR VISIBILITY                  FAIR VISIBILITY

```
ACQUIRE DIRECTION OF SUN      ～SC2

↓

ACQUIRE SURROUNDING
ACCIDENT INFORMATION          ～SC3

↓

ACQUIRE INFORMATION OF
SURROUNDING VEHICLES          ～SC4
```

FIG.15

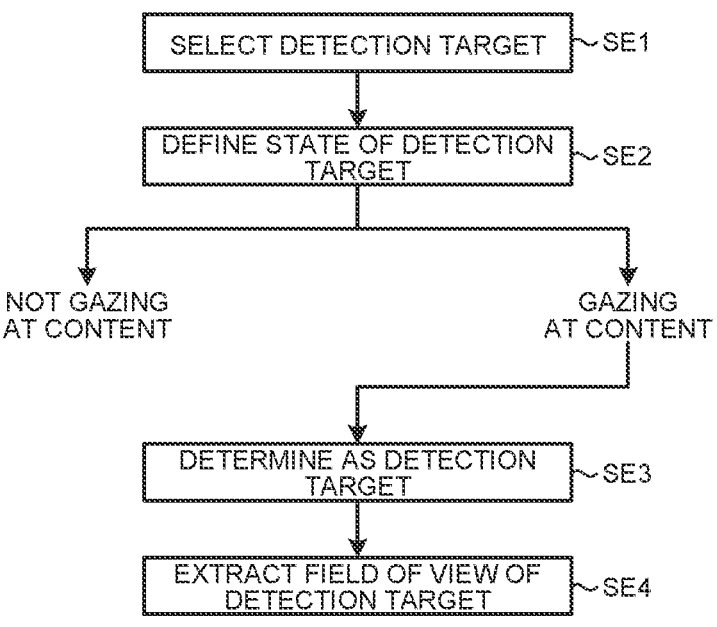

SELECT DETECTION TARGET ~SE1

DEFINE STATE OF DETECTION TARGET ~SE2

NOT GAZING AT CONTENT

GAZING AT CONTENT

DETERMINE AS DETECTION TARGET ~SE3

EXTRACT FIELD OF VIEW OF DETECTION TARGET ~SE4

FIG.16

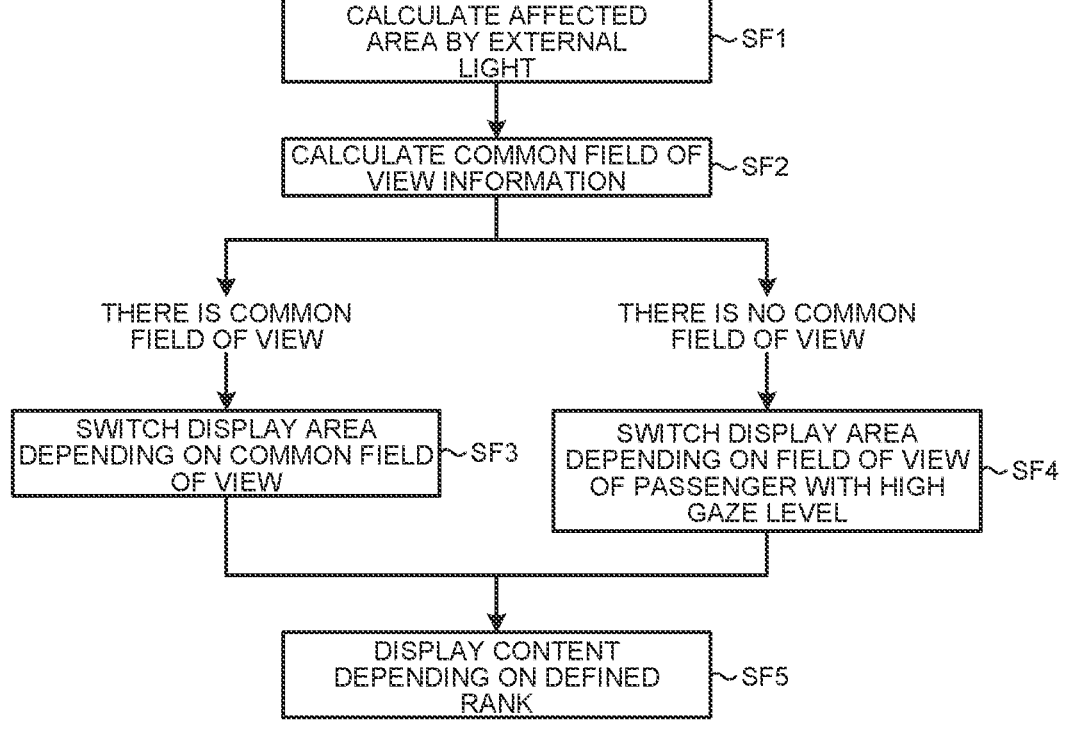

CALCULATE AFFECTED AREA BY EXTERNAL LIGHT ~SF1

CALCULATE COMMON FIELD OF VIEW INFORMATION ~SF2

THERE IS COMMON FIELD OF VIEW

THERE IS NO COMMON FIELD OF VIEW

SWITCH DISPLAY AREA DEPENDING ON COMMON FIELD OF VIEW ~SF3

SWITCH DISPLAY AREA DEPENDING ON FIELD OF VIEW OF PASSENGER WITH HIGH GAZE LEVEL ~SF4

DISPLAY CONTENT DEPENDING ON DEFINED RANK ~SF5

FIG.21
THERE IS NO CAR AROUND
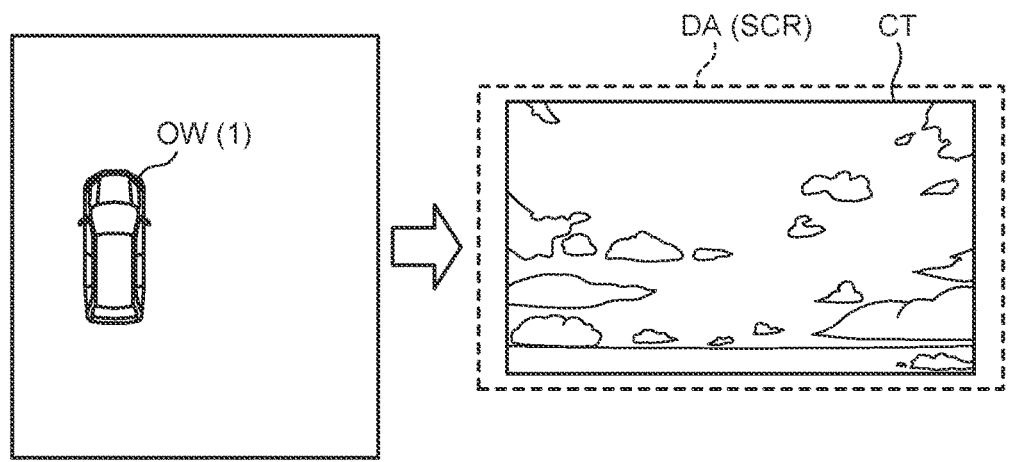
THERE IS CAR AT SLIGHTLY DISTANT POSITION
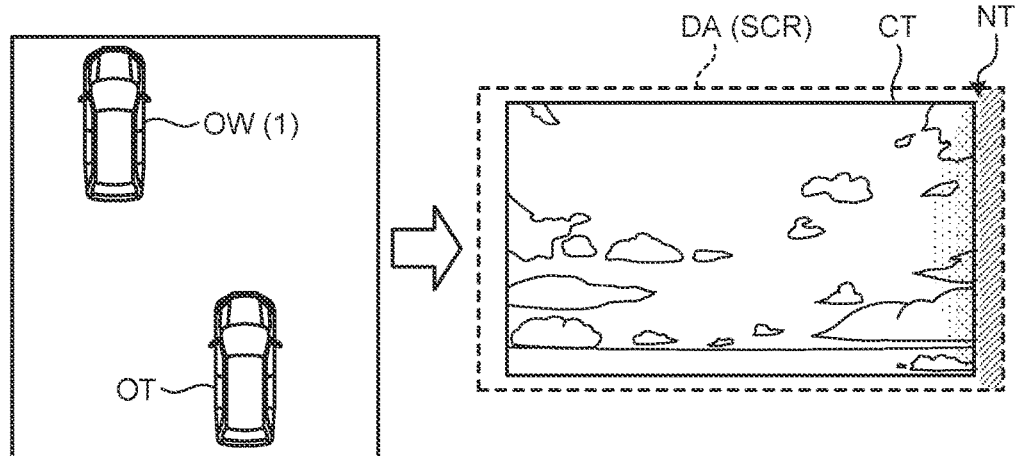
THERE IS CAR AT SHORT DISTANCE
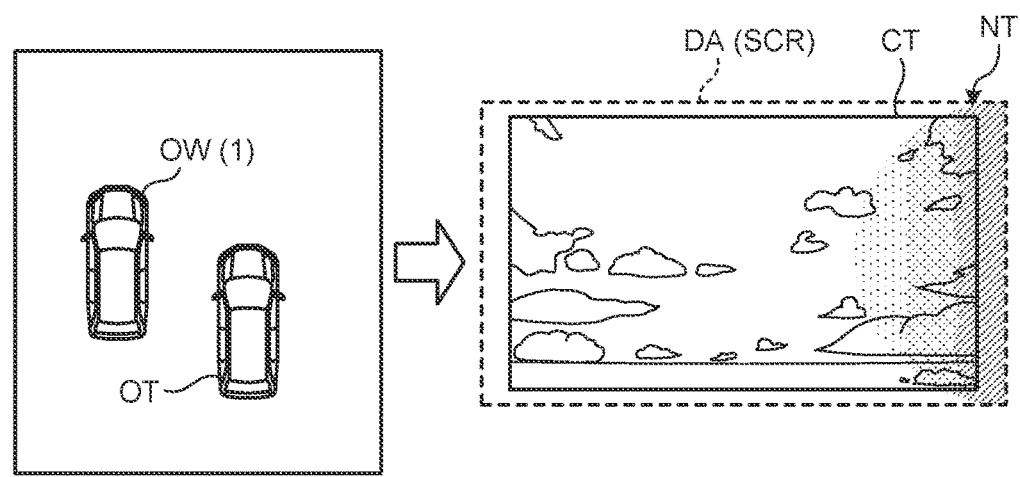

FIG.22
THERE IS NO CAR AROUND
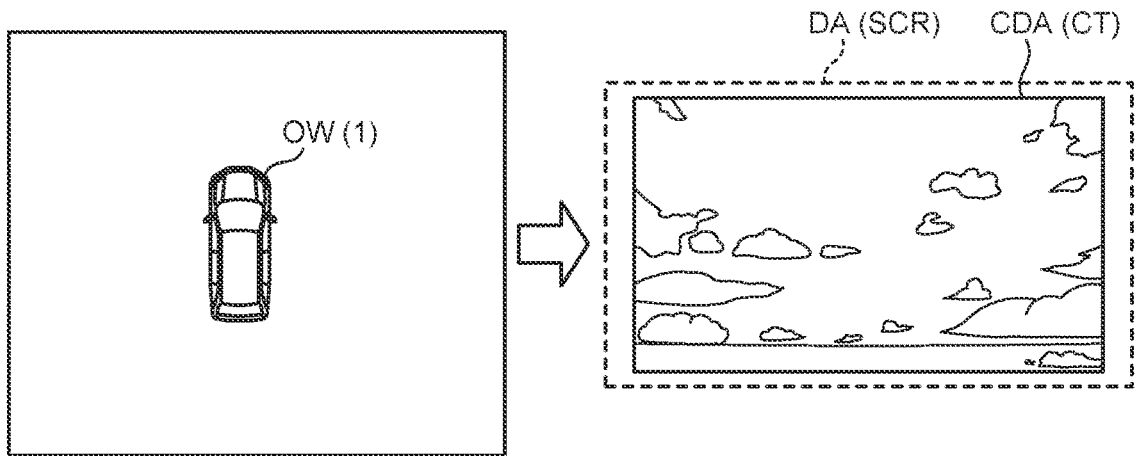
ACCIDENT OCCURRING AHEAD
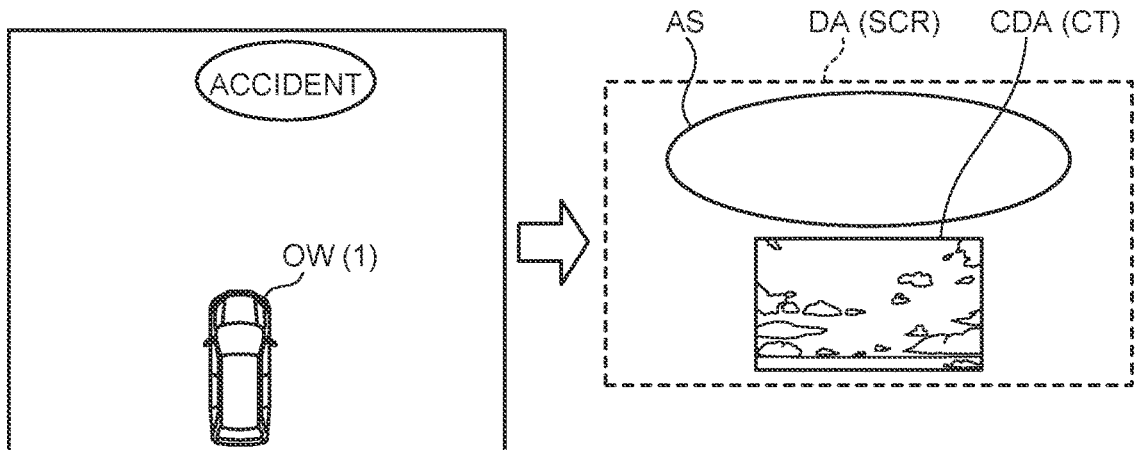
ACCIDENT OCCURRING AHEAD ON THE RIGHT
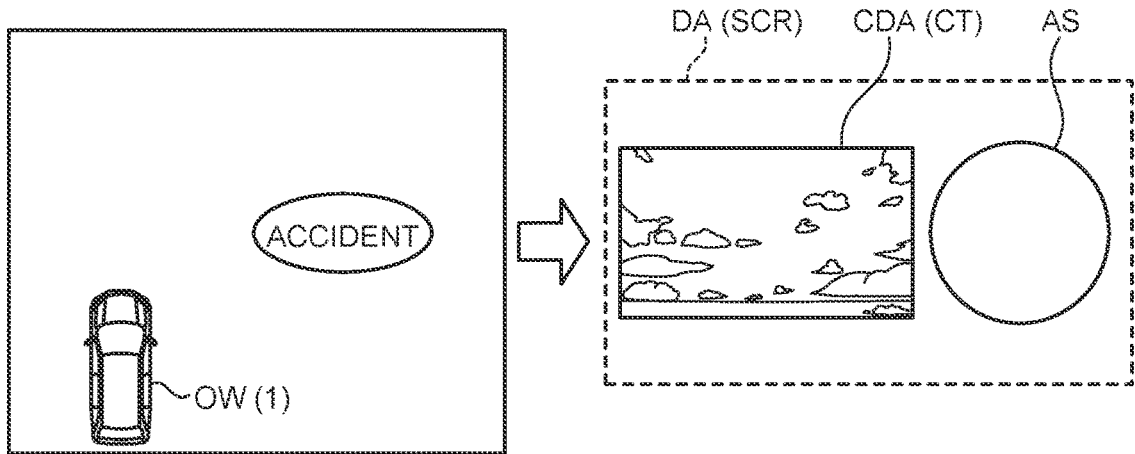

VEHICLE CONTROL SYSTEM AND VEHICLE CONTROL METHOD

CROSS REFERENCE TO RELATED APPLICATIONS

This application is a U.S. National Phase of International Patent Application No. PCT/JP2022/006036 filed on Feb. 16, 2022, which claims priority benefit of Japanese Patent Application No. JP 2021-150607 filed in the Japan Patent Office on Sep. 15, 2021. Each of the above-referenced applications is hereby incorporated herein by reference in its entirety.

FIELD

The present invention relates to a vehicle control system, a vehicle control method, and a program.

BACKGROUND

There is known technology of assisting driving of a driver by displaying information on a windshield or the like. Recently, efforts related to autonomous driving have progressed, and autonomous driving at level 3, in which a driver is free from the obligation to drive, is also being implemented.

CITATION LIST

Patent Literature

Patent Literature 1: JP 2017-174043 A

SUMMARY

Technical Problem

If the autonomous driving advances, the inside of the vehicle can be used as an entertainment space. A passenger can enjoy various entertainment content presented inside the vehicle. However, in the conventional vehicle control systems, no consideration is given to the convenience of passengers for enjoying the entertainment content.

Therefore, the present disclosure proposes a vehicle control system, a vehicle control method, and a program capable of enhancing the convenience of passengers for enjoying the entertainment content.

Solution to Problem

According to the present disclosure, a vehicle control system is provided that comprises a human-machine interface that performs display control of entertainment content on a basis of a monitoring result of a passenger. According to the present disclosure, a vehicle control method in which an information process of the vehicle control system is executed by a computer, and a program for causing the computer to execute the information process of the vehicle control system, are provided.

BRIEF DESCRIPTION OF DRAWINGS

FIG. 1 is a diagram illustrating an overview of display control of entertainment content.

FIG. 3 is a diagram illustrating an example of sensing areas by an external recognition sensor 25.

FIG. 10 is a table illustrating an example of a correspondence relationship among the information transmission level, the surrounding situation, and the display method.

FIG. 12 is a diagram illustrating details of processing.

FIG. 13 is a diagram illustrating details of processing.

FIG. 15 is a diagram illustrating details of processing.

FIG. 16 is a diagram illustrating details of processing.

FIG. 21 is a diagram illustrating a control example of a notification method of an event based on the information transmission level.

FIG. 22 is a diagram illustrating a control example of a content display position based on an occurrence position of an event.

DESCRIPTION OF EMBODIMENTS

Figure 2:
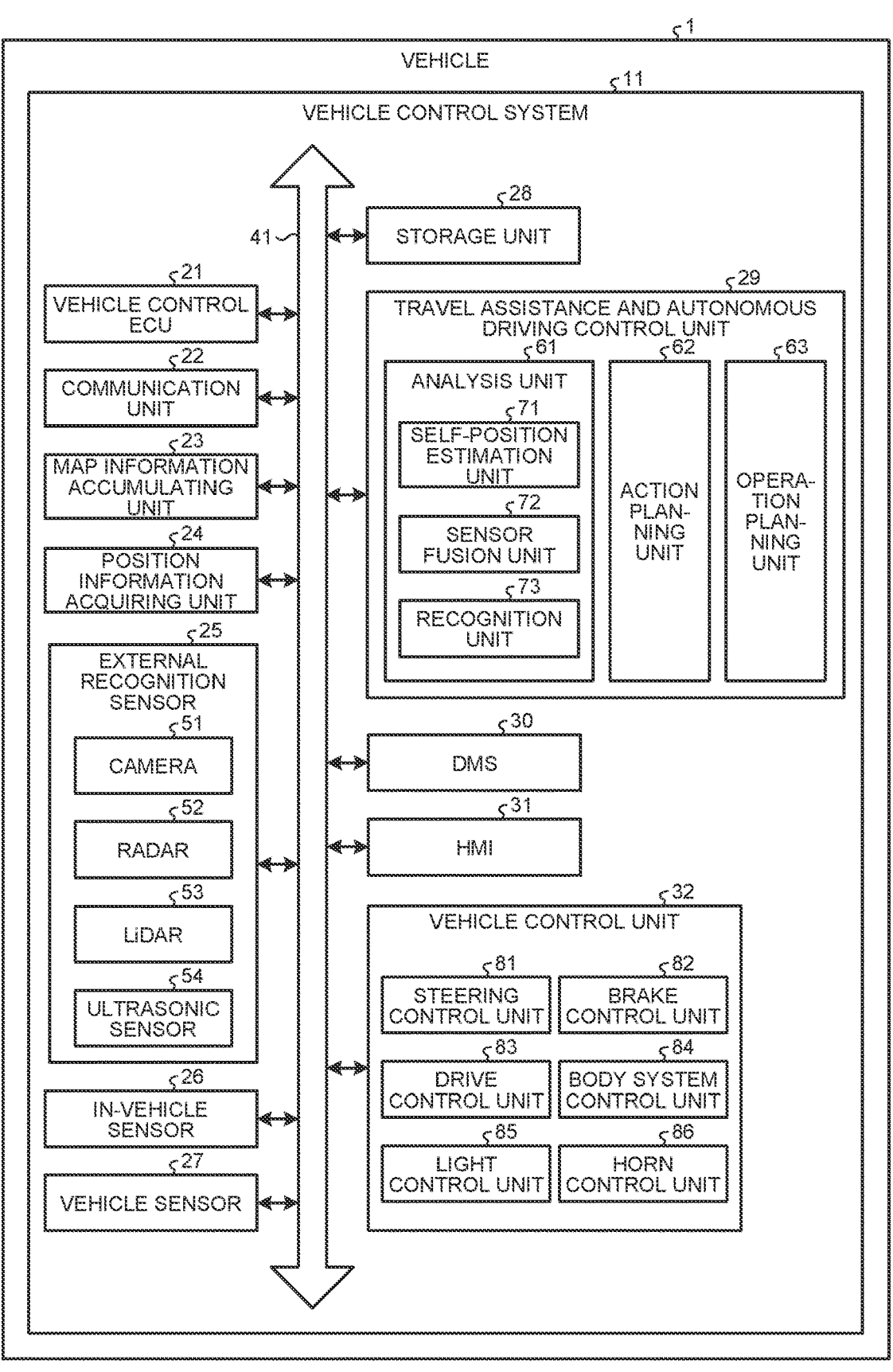
FIG. 2 is a block diagram illustrating a configuration example of a vehicle control system.

Hereinafter, embodiments of the present disclosure will be described in detail on the basis of the drawings. In each of the following embodiments, the same parts are denoted by the same symbols, and redundant description will be omitted.

Note that the description will be given in the following order.

[1. Overview of Display Control of Entertainment Content]

[2. Configuration Example of Vehicle Control System]
[3. Sensing Area of External Recognition Sensor]
[4. Configuration Example of In-vehicle Sensor and Image Display Unit]
[5. Display Control of Content Based on Monitoring Result of Inside and Outside of Vehicle]
[5-1. Monitoring Target]
[5-2. Display Control of Content Depending on Information Transmission Level]
[5-3. Processing Flow]
[6. Display Control Example]
[6-1. Notification of Event]
[6-2. Transparent Display of Event]
[6-3. Control of Content Display Position Based on Brightness Distribution]
[6-4. Control of Notification Method of Event Based on Information Transmission Level]
[6-5. Control of Content Display Position Based on Occurrence Position of Event]
[6-6. Control of Content Display Position Based on Viewing State of Passenger]
[6-7. Display Control Based on Viewing States of Plurality of Passengers]
[7. Effects]

1. Overview of Display Control of Entertainment Content

Figure 1:
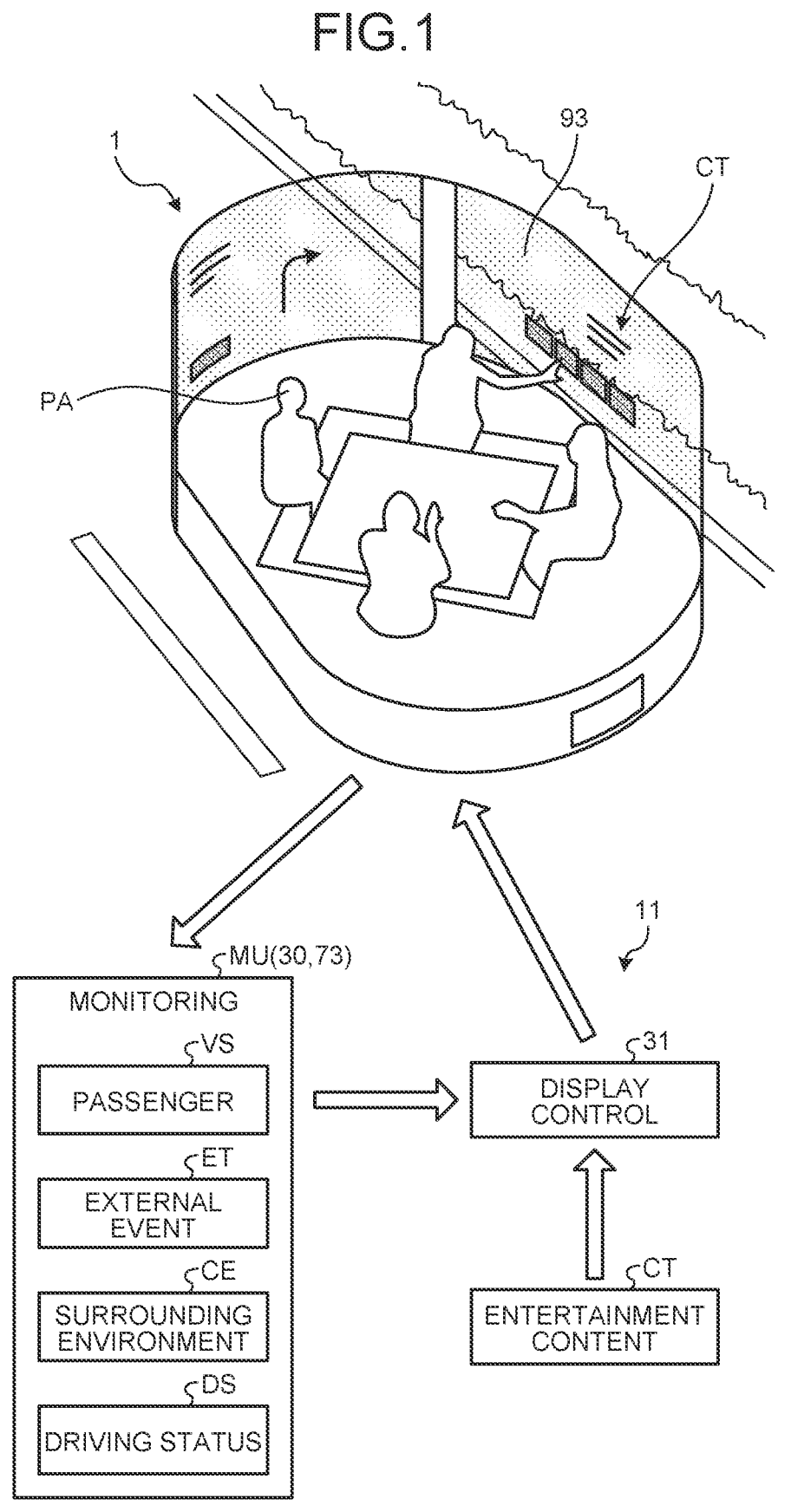

FIG. 1 is a diagram illustrating an overview of display control of entertainment content CT.

The vehicle 1 includes a vehicle control system 11 capable of performing autonomous driving. A passenger PA can use the inside of the vehicle as an entertainment space. The vehicle 1 includes an image display unit 93 capable of displaying the entertainment content CT. The entertainment content CT is not intended to assist the driver in driving but to entertain the passenger PA. Examples of the entertainment content CT include movies, music, game, news, mails, map or tourist information, SNSs, and a chat.

The image display unit 93 can switch between, for example, a display state and a transparent state. The image display unit 93 is disposed in such a manner as to surround the space inside the vehicle along an inner wall or a partition wall of the vehicle 1. The image display unit 93 presents the content CT in the display state and causes the passenger PA to see the outside of the vehicle therethrough in the transparent state.

The "display state" includes a translucent state in which information such as an image displayed on a scene outside the vehicle can be superimposed like augmented reality (AR). The image display unit 93 can perform AR display by superimposing an image on a scene outside the vehicle. The image display unit 93 adjusts, for example, the display brightness, the transparency or the haze of the image display unit 93 depending on the brightness outside the vehicle. This can enhance the visibility of the content CT.

The vehicle control system 11 includes a monitoring unit MU and a human-machine interface (HMI) 31. The monitoring unit MU acquires various types of information inside and outside the vehicle using various sensors mounted on the vehicle 1. The monitoring unit MU outputs the acquired information to the HMI 31 as monitoring information. The monitoring unit MU includes, for example, a DMS 30 and a recognition unit 73 described later.

The monitoring information includes information regarding the viewing state of the passenger PA (viewing state information VS), information regarding an event outside the vehicle (event information ET), information regarding the surrounding environment (environment information CE), information regarding the driving status DS, and the like. The HMI 31 performs display control of the entertainment content CT on the basis of the monitoring information. The monitoring unit MU records, for example, the display position of the content CT and the gaze situation of the passenger PA on the content CT as a record of the in-vehicle situation during traveling and stores the record in a storage unit 28 (see FIG. 2). A part of the vehicle control system 11 including the storage unit 28 may be implemented as a function on a cloud via a communication unit 22.

2. Configuration Example of Vehicle Control System

FIG. 2 is a block diagram illustrating a configuration example of the vehicle control system 11.

The vehicle control system 11 is included in the vehicle 1 and performs processing related to travel assistance and autonomous driving of the vehicle 1.

The vehicle control system 11 includes a vehicle control electronic control unit (ECU) 21, the communication unit 22, a map information accumulating unit 23, a position information acquiring unit 24, an external recognition sensor 25, an in-vehicle sensor 26, a vehicle sensor 27, the storage unit 28, a travel assistance and autonomous driving control unit 29, the driver monitoring system (DMS) 30, the human machine interface (HMI) 31, and a vehicle control unit 32.

The vehicle control ECU 21, the communication unit 22, the map information accumulating unit 23, the position information acquiring unit 24, the external recognition sensor 25, the in-vehicle sensor 26, the vehicle sensor 27, the storage unit 28, the travel assistance and autonomous driving control unit 29, the driver monitoring system (DMS) 30, the human-machine interface (HMI) 31, and the vehicle control unit 32 are communicably connected to each other via a communication network 41. The communication network 41 includes, for example, an in-vehicle communication network, a bus, or the like conforming to a digital bidirectional communication standard such as a controller area network (CAN), a local interconnect network (LIN), a local area network (LAN), FlexRay (registered trademark), or Ethernet (registered trademark). The communication network 41 may be selectively used depending on the type of data to be transmitted. For example, the CAN may be applied to data related to vehicle control, and Ethernet may be applied to large-capacity data. Note that each of the units of the vehicle control system 11 may be directly connected, not via the communication network 41, but by using wireless communication based on a premise of communication at a relatively short distance, such as near field communication (NFC) or Bluetooth (registered trademark).

Note that, hereinafter, in a case where each of the units of the vehicle control system 11 performs communication via the communication network 41, the communication network 41 will not be mentioned. For example, in a case where the vehicle control ECU 21 and the communication unit 22 perform communication via the communication network 41, it is simply described that the vehicle control ECU 21 and the communication unit 22 communicate to each other.

The vehicle control ECU 21 is implemented by various types of processors such as a central processing unit (CPU) or a micro processing unit (MPU). The vehicle control ECU 21 controls the entire or a part of the functions of the vehicle control system 11.

The communication unit 22 communicates with various devices inside and outside the vehicle, other vehicles, servers, base stations, and the like and transmits and receives various types of data. At this point, the communication unit 22 can perform communication using a plurality of communication schemes.

External communication that the communication unit 22 can execute will be described schematically. The communication unit 22 communicates with a server (hereinafter, referred to as an external server) or the like present on an external network via a base station or an access point by a wireless communication scheme such as the 5th generation mobile communication system (5G), long term evolution (LTE), or dedicated short range communications (DSRC). The external network with which the communication unit 22 communicates is, for example, the Internet, a cloud network, a network unique to a company, or the like. The communication scheme performed by the communication unit 22 with respect to an external network is not particularly limited as long as it is a wireless communication scheme capable of performing digital bidirectional communication at a communication speed equal to or higher than a predetermined speed and at a distance longer than or equal to a predetermined distance.

Furthermore, for example, the communication unit 22 can communicate with a terminal present in the vicinity of the host vehicle using peer to peer (P2P) technology. The terminal present in the vicinity of the host vehicle includes, for example, a terminal worn by a traveling body traveling at a relatively low speed such as a pedestrian or a bicycle, a terminal installed in a store or the like with a position fixed, or a machine type communication (MTC) terminal. Furthermore, the communication unit 22 can also perform V2X communication. The V2X communication refers to communication between the host vehicle and others such as vehicle to vehicle communication carried out with another vehicle, vehicle to infrastructure communication carried out with a roadside apparatus, vehicle to home communication, and vehicle to pedestrian communication carried out with a terminal carried by a pedestrian.

For example, the communication unit 22 can receive a program for updating software for controlling the operation of the vehicle control system 11 from the outside (over-the-air). The communication unit 22 can further receive map information, traffic information, information around the vehicle 1, and the like from the outside. Furthermore, for example, the communication unit 22 can transmit information regarding the vehicle 1, information around the vehicle 1, and the like to the outside. Examples of the information regarding the vehicle 1 transmitted to the outside by the communication unit 22 include data indicating the state of the vehicle 1, a recognition result by the recognition unit 73, and the like. Furthermore, for example, the communication unit 22 performs communication conforming to a vehicle emergency call system such as an eCall.

For example, the communication unit 22 receives an electromagnetic wave transmitted by a road traffic information communication system (Vehicle Information and Communication System (VICS) (registered trademark)) such as a radio wave beacon, an optical beacon, or FM multiplex broadcasting.

Communication with the inside of the vehicle that the communication unit 22 can execute will be schematically described. The communication unit 22 can communicate with each device in the vehicle using, for example, wireless communication. The communication unit 22 can perform wireless communication with an in-vehicle device by a communication scheme capable of performing digital bidirectional communication at a predetermined communication speed or higher by wireless communication, such as wireless LAN, Bluetooth, NFC, or wireless USB (WUSB). Without being limited to the above, the communication unit 22 can also communicate with each device in the vehicle using wired communication. For example, the communication unit 22 can communicate with each device in the vehicle by wired communication via a cable connected to a connection terminal (not illustrated). The communication unit 22 can communicate with each device in the vehicle by a communication scheme capable of performing digital bidirectional communication at a predetermined communication speed or higher by wired communication, such as the universal serial bus (USB), the high-definition multimedia interface (HDMI) (registered trademark), or the mobile high-definition link (MHL).

Here, a device in the vehicle refers to, for example, a device that is not connected to the communication network 41 in the vehicle. As examples of the device in the vehicle, a mobile device or a wearable device carried by a passenger such as a driver, an information device brought into the vehicle and temporarily installed, or the like are conceivable.

The map information accumulating unit 23 accumulates one or both of a map acquired from the outside and a map created by the vehicle 1. For example, the map information accumulating unit 23 accumulates three-dimensional high-precision maps, a global map having lower accuracy than the high-precision maps but covering a wide area, and others.

The high-precision maps are, for example, dynamic maps, point cloud maps, vector maps, or others. A dynamic map is, for example, a map including four layers of dynamic information, semi-dynamic information, semi-static information, and static information and is provided to the vehicle 1 from an external server or the like. A point cloud map includes a point cloud (point group data). A vector map is, for example, a map in which traffic information such as lanes and positions of traffic lights is associated with a point cloud map and adapted to an advanced driver assistance system (ADAS) or autonomous driving (AD).

The point cloud map and the vector map may be provided from, for example, an external server or the like or may be created by the vehicle 1 as a map for performing matching with a local map to be described later on the basis of a sensing result by a camera 51, a radar 52, a LiDAR 53, or the like and may be accumulated in the map information accumulating unit 23. In addition, in a case where a high-precision map is provided from an external server or the like, for example, map data of several hundred meters square regarding a planned path on which the vehicle 1 travels subsequently is acquired from an external server or the like in order to reduce the communication capacity.

The position information acquiring unit 24 receives global navigation satellite system (GNSS) signals from GNSS satellites and acquires position information of the vehicle 1. The acquired position information is supplied to the travel assistance and autonomous driving control unit 29. Note that the position information acquiring unit 24 is not limited to the method using the GNSS signals and may acquire the position information using, for example, a beacon.

The external recognition sensor 25 includes various sensors used for recognition of a situation outside the vehicle 1 and supplies sensor data from each of the sensors to units in the vehicle control system 11. Any type and any number of sensors may be included in the external recognition sensor 25.

For example, the external recognition sensor 25 includes the camera 51, the radar 52, the light detection and ranging or laser imaging detection and ranging (LiDAR) 53, and an ultrasonic sensor 54. Without being limited thereto, the external recognition sensor 25 may include one or more types of sensors among the camera 51, the radar 52, the LiDAR 53, and the ultrasonic sensor 54. The numbers of the cameras 51, the radars 52, the LiDARs 53, and the ultrasonic sensors 54 are not particularly limited as long as they can be practically installed in the vehicle 1. Furthermore, the type of sensor included in the external recognition sensor 25 is not limited to this example, and the external recognition sensor 25 may include another type of sensor. Examples of the sensing area of each sensor included in the external recognition sensor 25 will be described later.

Note that the imaging method of the camera 51 is not particularly limited. For example, cameras of various imaging methods such as a time-of-flight (ToF) camera using an imaging method capable of ranging, stereo cameras, a monocular camera, and an infrared camera can be applied to the camera 51 as necessary. Without being limited thereto, the camera 51 may simply acquire a captured image regardless of ranging.

Furthermore, for example, the external recognition sensor 25 can include an environment sensor for detecting the environment for the vehicle 1. The environment sensor is a sensor for detecting the environment such as the weather, the climate, or the brightness and can include various sensors such as a raindrop sensor, a fog sensor, a sunshine sensor, a snow sensor, and an illuminance sensor.

Furthermore, for example, the external recognition sensor 25 includes a microphone used for detection of sound around the vehicle 1, a position of a sound source, and others.

The in-vehicle sensor 26 includes various sensors for detecting information inside the vehicle and supplies sensor data from each sensor to each unit of the vehicle control system 11. The type and the number of various sensors included in the in-vehicle sensor 26 are not particularly limited as long as they can be practically installed in the vehicle 1.

For example, the in-vehicle sensor 26 can include one or more types of sensors among a camera, a radar, a seating sensor, a steering wheel sensor, a microphone, and a biological sensor. As a camera included in the in-vehicle sensor 26, for example, cameras of various imaging methods capable of ranging, such as a ToF camera, stereo cameras, a monocular camera, and an infrared camera, can be used. Without being limited thereto, the camera included in the in-vehicle sensor 26 may simply acquire a captured image regardless of ranging. The biological sensor included in the in-vehicle sensor 26 is provided, for example, on a seat, a steering wheel, or others and detects various types of biological information of a passenger such as a driver.

The vehicle sensor 27 includes various sensors for detecting the state of the vehicle 1 and supplies sensor data from each sensor to each unit of the vehicle control system 11. The type or the number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) integrating these sensors. For example, the vehicle sensor 27 includes a steering angle sensor that detects the steering angle of the steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of revolutions of the engine or the motor, an air pressure sensor that detects the air pressure of the tires, a slip ratio sensor that detects the slip ratio of the tires, and a wheel speed sensor that detects the rotational speed of the wheels. For example, the vehicle sensor 27 includes a battery sensor that detects a remaining amount and the temperature of a battery and an impact sensor that detects an impact from the outside. The vehicle sensor 27 includes a sensor that detects the driving status DS.

The storage unit 28 includes at least one of a nonvolatile storage medium or a volatile storage medium and stores data or a program. The storage unit 28 is used as, for example, an electrically erasable programmable read-only memory (EEPROM) and a random access memory (RAM), and a magnetic storage device such as a hard disc drive (HDD), a semiconductor storage device, an optical storage device, and a magneto-optical storage device can be applied as the storage medium. The storage unit 28 stores various programs and data used by each unit of the vehicle control system 11. For example, the storage unit 28 includes an event data recorder (EDR) and a data storage system for automated driving (DSSAD) and stores information of the vehicle 1 before and after an event such as an accident and information acquired by the in-vehicle sensor 26.

The travel assistance and autonomous driving control unit 29 controls travel assist and autonomous driving of the vehicle 1. For example, the travel assistance and autonomous driving control unit 29 includes an analysis unit 61, an action planning unit 62, and an operation control unit 63.

The analysis unit 61 performs analysis processing of the situation of the vehicle 1 and the surroundings. The analysis unit 61 includes a self-position estimation unit 71, a sensor fusion unit 72, and the recognition unit 73.

The self-position estimation unit 71 estimates the self-position of the vehicle 1 on the basis of the sensor data from the external recognition sensor 25 and the high-precision maps accumulated in the map information accumulating unit 23. For example, the self-position estimation unit 71 generates a local map on the basis of the sensor data from the external recognition sensor 25 and estimates the self-position of the vehicle 1 by matching the local map with the high-precision maps. The position of the vehicle 1 is based on, for example, the center of the axel of the pair of rear wheels.

The local map is, for example, a three-dimensional high-precision map created using technology such as simultaneous localization and mapping (SLAM), an occupancy grid map, or the like. The three-dimensional high-precision map is, for example, the above-described point cloud map or the like. An occupancy grid map is a map in which a three-dimensional or two-dimensional space around the vehicle 1 is divided into grids of a predetermined size, and an occupancy state of an object is indicated for each grid. The occupancy state of the object is indicated by, for example, the presence or absence or the existence probability of the object. The local map may also be used for, for example, detection processing and recognition processing of a situation outside the vehicle 1 by the recognition unit 73.

Note that the self-position estimation unit 71 may estimate the self-position of the vehicle 1 on the basis of the position information acquired by the position information acquiring unit 24 and the sensor data from the vehicle sensor 27.

The sensor fusion unit 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and others.

The recognition unit 73 executes detection processing for detecting the situation outside the vehicle 1 and recognition processing for recognizing the situation outside the vehicle 1.

For example, the recognition unit 73 performs detection processing and recognition processing of the situation outside the vehicle 1 on the basis of information from the external recognition sensor 25, information from the self-position estimation unit 71, information from the sensor fusion unit 72, and others.

Specifically, for example, the recognition unit 73 performs detection processing, recognition processing, and others of an object around the vehicle 1. The object detection processing is, for example, processing of detecting the presence or absence, the size, the shape, the position, the movement, and the like of an object. The object recognition processing is, for example, processing of recognizing an attribute such as the type of an object or distinguishing a specific object. However, the detection processing and the recognition processing are not necessarily clearly distinguished and may overlap with each other.

For example, the recognition unit 73 detects an object around the vehicle 1 by performing clustering of classifying a point cloud based on sensor data by the radar 52, the LiDAR 53, or the like into clusters of point groups. As a result, the presence or absence, the size, the shape, and the position of an object around the vehicle 1 are detected.

For example, the recognition unit 73 detects the motion of an object around the vehicle 1 by tracking the motions of the clusters of point groups classified by the clustering. As a result, the speed and the traveling direction (motion vector) of the object around the vehicle 1 are detected.

For example, the recognition unit 73 detects or recognizes a vehicle, a person, a bicycle, an obstacle, a structure, a road, a traffic light, a traffic sign, a road marking, and the like on the basis of image data supplied from the camera 51. Furthermore, the recognition unit 73 may recognize the type of the object around the vehicle 1 by performing recognition processing such as semantic segmentation.

For example, the recognition unit 73 can perform recognition processing of traffic rules around the vehicle 1 on the basis of the maps accumulated in the map information accumulating unit 23, an estimation result of the self-position by the self-position estimation unit 71, and a recognition result of an object around the vehicle 1 by the recognition unit 73. Through this processing, the recognition unit 73 can recognize the position and the state of a traffic light, the content of a traffic sign and a road marking, the content of a traffic regulation, available lanes, and the like.

For example, the recognition unit 73 can perform recognition processing of the surrounding environment of the vehicle 1. As the surrounding environment to be recognized by the recognition unit 73, the presence or absence of a pedestrian and a surrounding vehicle, the weather, the temperature, the humidity, the brightness, the state of a road surface, and the like are conceivable.

The action planning unit 62 creates an action plan of the vehicle 1. For example, the action planning unit 62 creates the action plan by performing processing of global path planning and path tracking.

Note that the global path planning is processing of planning a rough path from the start to the goal. This global path planning is called a locus plan and includes processing of performing locus path planning (local path planning) that enables safe and smooth traveling in the vicinity of the vehicle 1 in consideration of the motion characteristics of the vehicle 1 in the planned path.

The path tracking is processing of planning an operation for safely and accurately traveling on the path planned by the global path planning within a planned time. For example, the action planning unit 62 can calculate the target speed and the target angular velocity of the vehicle 1 on the basis of the result of the path tracking processing.

The operation control unit 63 controls the operation of vehicle 1 in order to implement the action plan created by the action planning unit 62.

For example, the operation control unit 63 controls a steering control unit 81, a brake control unit 82, and a drive control unit 83 included in the vehicle control unit 32 to be described later to perform acceleration and deceleration control and direction control in such a manner that the vehicle 1 travels on the locus calculated by the locus plan. For example, the operation control unit 63 performs cooperative control for the purpose of implementing the functions of the ADAS such as collision avoidance or impact mitigation, follow-up traveling, vehicle speed maintaining traveling, collision warning for the host vehicle, lane deviation warning for the host vehicle, and the like. The operation control unit 63 performs, for example, cooperative control intended for autonomous driving or the like in which the vehicle travels autonomously without depending on the operation of the driver.

The DMS 30 performs authentication processing of the driver, a recognition processing of the state of the driver, and the like on the basis of sensor data from the in-vehicle sensor 26, input data input to the HMI 31 to be described later, and others. As the state of the driver to be recognized, for example, the physical condition, an arousal level, a concentration level, a fatigue level, a line-of-sight direction, a drunkenness level, a driving operation, a posture, and the like are conceivable.

Note that the DMS 30 may perform authentication processing of a passenger other than the driver and recognition processing of the state of the passenger. Furthermore, for example, the DMS 30 may perform recognition processing of the situation inside the vehicle on the basis of sensor data from the in-vehicle sensor 26. As the situation inside the vehicle to be recognized, for example, the temperature, the humidity, the brightness, the odor or the scent, and the like are conceivable.

The HMI 31 inputs various types of data, instructions, and the like and presents the various types of data to passengers including the driver.

Data input by the HMI 31 will be schematically described. The HMI 31 includes an input device for a person to input data. The HMI 31 generates an input signal on the basis of data, an instruction, or the like input by the input device and supplies the input signal to each unit of the vehicle control system 11. The HMI 31 includes an operator such as a touch panel, a button, a switch, or a lever as the input device. Without being limited thereto, the HMI 31 may further include an input device capable of inputting information by a method other than manual operation such as by voice, a gesture, or others. Furthermore, the HMI 31 may use, for example, a remote control device using infrared rays or radio waves or an external connection device such as a mobile device or a wearable device supporting the operation of the vehicle control system 11 as an input device.

Presentation of data by the HMI 31 will be schematically described. The HMI 31 generates visual information, auditory information, and tactile information for the passengers or the outside of the vehicle. In addition, the HMI 31 performs output control for controlling output, output content, output timing, an output method, and others of each piece of information that is generated. The HMI 31 generates and outputs, as the visual information, for example, an operation screen, a state display of the vehicle 1, warning display, a monitor image indicating a situation around the vehicle 1, and information indicated by an image or light such as the entertainment content CT. Furthermore, the HMI 31 generates and outputs information indicated by sounds such as a voice guidance, a warning sound, or a warning message as the auditory information. Furthermore, the HMI 31 generates and outputs, as the tactile information, information given to the tactile sense of the passengers by, for example, a force, vibrations, a motion, or the like.

As an output device with which the HMI 31 outputs the visual information, for example, a display device that presents the visual information by displaying an image thereon or a projector device that presents the visual information by projecting an image are applicable. Note that the display device may be a device that displays the visual information in the field of view of the passengers such as a head-up display, a transmissive display, or a wearable device having an augmented reality (AR) function other than a display device having a normal display. In addition, the HMI 31 can use display devices included in a navigation device, an instrument panel, a camera monitoring system (CMS), an electronic mirror, a lamp, or the like included in the vehicle 1 as an output device that outputs the visual information.

As an output device from which the HMI 31 outputs the auditory information, for example, an audio speaker, headphones, or earphones are applicable.

As an output device to which the HMI 31 outputs the tactile information, for example, a haptics element using haptic technology is applicable. The haptics element is provided, for example, at a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls the state of the steering system of the vehicle 1. The steering system includes, for example, a steering mechanism including a steering wheel and the like, an electric power steering, and the like. The steering control unit 81 includes, for example, a steering ECU that controls the steering system, an actuator that drives the steering system, and others.

The brake control unit 82 performs detection and control of the state of the brake system of the vehicle 1. The brake system includes, for example, a brake mechanism including a brake pedal, an antilock brake system (ABS), a regenerative brake mechanism, and the like. The brake control unit 82 includes, for example, a brake ECU that controls the brake system, an actuator that drives the brake system, and the like.

The drive control unit 83 detects and controls the state of the drive system of the vehicle 1. The drive system includes, for example, a driving force generation device for generating a driving force such as an accelerator pedal, an internal combustion engine, and a driving motor, a driving force transmission mechanism for transmitting the driving force to wheels, and others. The drive control unit 83 includes, for example, a drive ECU that controls the drive system, actuators that drive the drive system, and others.

The body system control unit 84 detects and controls the state of a body system of the vehicle 1. The body system includes, for example, a keyless entry system, a smart key system, a power window device, a power seat, an air conditioner, an airbag, a seat belt, a shift lever, and others. The body system control unit 84 includes, for example, a body system ECU that controls the body system, actuators that drive the body system, and others.

The light control unit 85 detects and controls states of various lights of the vehicle 1. As the lights to be controlled, for example, a headlight, a backlight, a fog light, a turn signal, a brake light, projection, display on a bumper, and the like are conceivable. The light control unit 85 includes a light ECU that controls the lights, actuators that drives the lights, and the like.

The horn control unit 86 detects and controls the state of the car horn of the vehicle 1. The horn control unit 86 includes, for example, a horn ECU that controls the car horn, an actuator that drives the car horn, and the like.

3. Sensing Area of External Recognition Sensor

Figure 3:
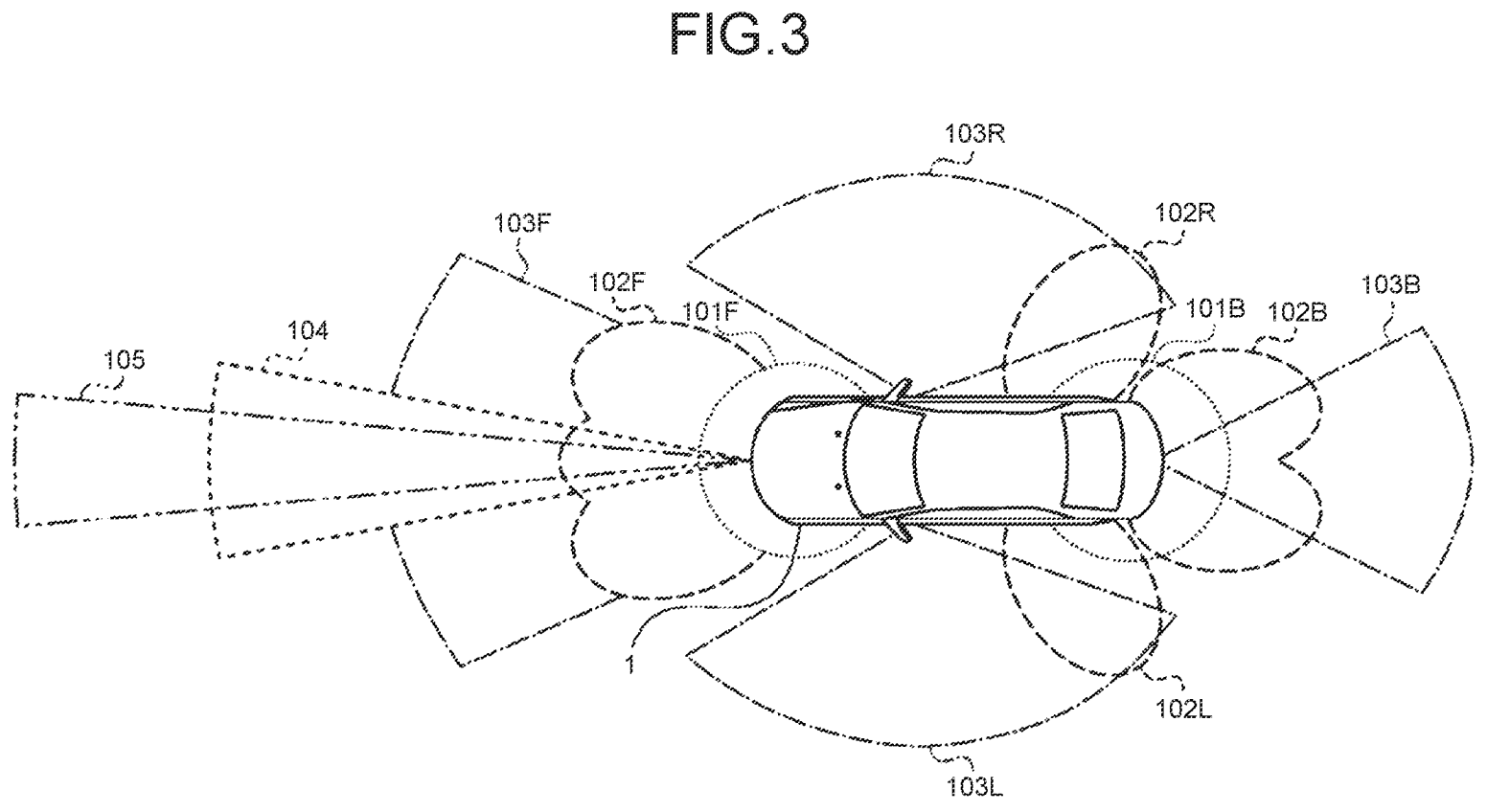

FIG. 3 is a diagram illustrating an example of a sensing area by the camera 51, the radar 52, the LiDAR 53, the ultrasonic sensor 54, or others of the external recognition sensor 25. Note that FIG. 3 schematically illustrates the vehicle 1 as viewed from above. When FIG. 3 is viewed in a direction in which the symbols are displayed in the correct direction, the left end side is the front end (front) side of the vehicle 1, and the right end side is the rear end (rear) side of the vehicle 1.

A sensing area 101F and a sensing area 101B indicate examples of sensing areas of the ultrasonic sensor 54. The sensing area 101F covers the periphery of the front end of the vehicle 1 by a plurality of ultrasonic sensors 54. The sensing area 101B covers the periphery of the rear end of the vehicle 1 by a plurality of ultrasonic sensors 54.

Sensing results in the sensing area 101F and the sensing area 101B are used, for example, for parking assistance of the vehicle 1.

A sensing area 102F or a sensing area 102B indicates an example of a sensing area of the radar 52 for a short distance or a middle distance. The sensing area 102F covers up to a position farther than the sensing area 101F ahead of the vehicle 1. The sensing area 102B covers up to a position farther than the sensing area 101B behind the vehicle 1. A sensing area 102L covers the rear periphery of the left side face of the vehicle 1. A sensing area 102R covers the rear periphery of the right side face of the vehicle 1.

A sensing result in the sensing area 102F is used, for example, to detect a vehicle, a pedestrian, or the like present ahead of the vehicle 1. A sensing result in the sensing area 102B is used, for example, for a collision prevention function or the like behind the vehicle 1. Sensing results in the sensing area 102L and the sensing area 102R are used, for example, for detecting an object in a blind spot on the sides of the vehicle 1.

A sensing area 103F or a sensing area 103B indicates examples of a sensing area by the camera 51. The sensing area 103F covers up to a position farther than the sensing area 102F ahead of the vehicle 1. The sensing area 103B covers up to a position farther than the sensing area 102B behind the vehicle 1. A sensing area 103L covers the periphery of the left side face of the vehicle 1. A sensing area 103R covers the periphery of the right side face of the vehicle 1.

A sensing result in the sensing area 103F can be used for, for example, recognition of a traffic light or a traffic sign, a lane deviation prevention assist system, and an automatic headlight control system. A sensing result in the sensing area 103B can be used for, for example, parking assistance and a surround view system. Sensing results in the sensing area 103L and the sensing area 103R can be used for the surround view system, for example.

A sensing area 104 indicates an example of a sensing area of the LiDAR 53. The sensing area 104 covers up to a position farther than the sensing area 103F ahead of the vehicle 1. Meanwhile, the sensing area 104 has a narrower area in the left-right direction than that of the sensing area 103F.

A sensing result in the sensing area 104 is used, for example, for detecting an object such as a surrounding vehicle.

A sensing area 105 indicates an example of a sensing area of the radar 52 for a long distance. The sensing area 105 covers up to a position farther than the sensing area 104 ahead of the vehicle 1. Meanwhile, the sensing area 105 has a narrower area in the left-right direction than that of the sensing area 104.

A sensing result in the sensing area 105 is used for, for example, adaptive cruise control (ACC), emergency braking, collision avoidance, and the like.

Note that the sensing areas of the sensors of the camera 51, the radar 52, the LiDAR 53, and the ultrasonic sensor 54 included in the external recognition sensor 25 may have various configurations other than those in FIG. 3. Specifically, the ultrasonic sensor 54 may also perform sensing on the sides of the vehicle 1, or the LiDAR 53 may perform sensing behind the vehicle 1. In addition, the installation positions of the sensors are not limited to the examples described above. The number of sensors may be one or more.

4. Configuration Example of In-Vehicle Sensor and Image Display Unit

Figure 4:
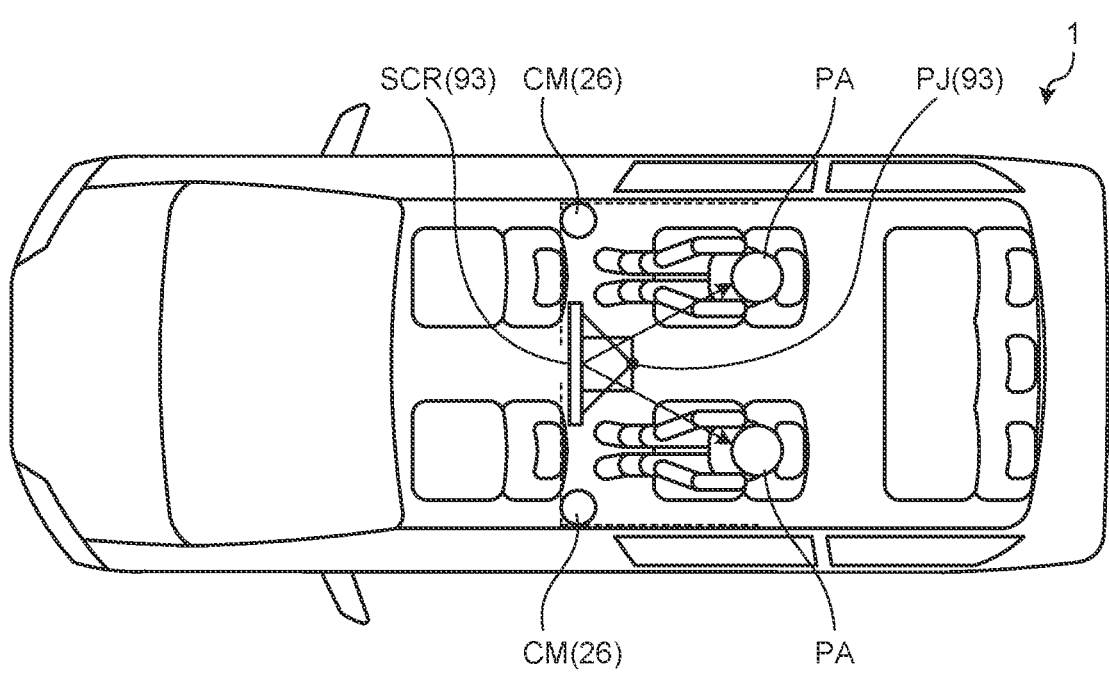
FIG. 4 is a diagram illustrating a configuration example of in-vehicle sensors and an image display unit.
Figure 5:
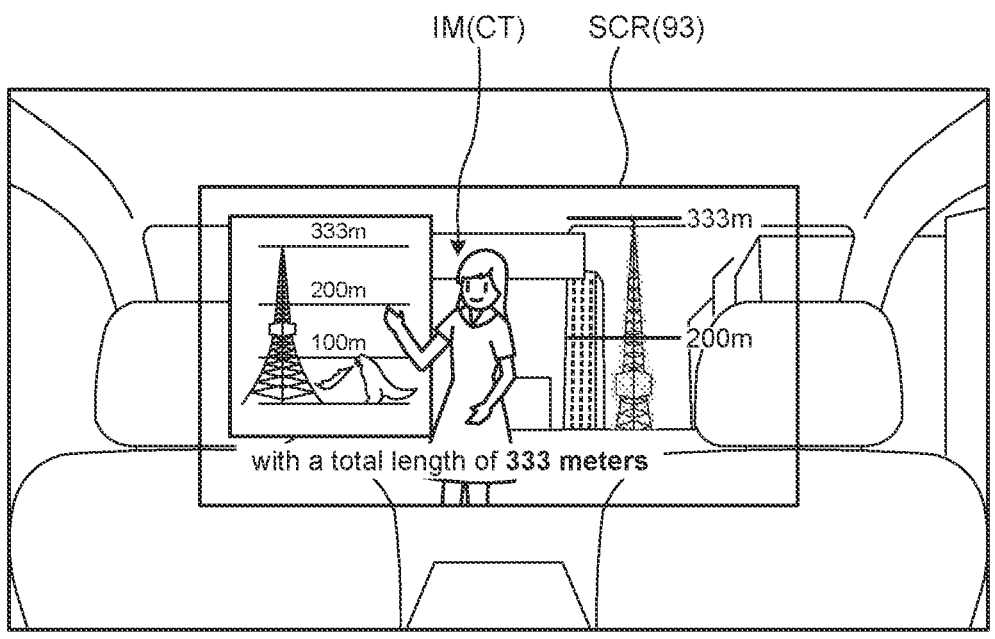
FIG. 5 is a diagram illustrating a display example of an image provided as content.

FIG. 4 is a diagram illustrating a configuration example of in-vehicle sensors 26 and the image display unit 93. FIG. 5 is a diagram illustrating a display example of an image IM provided as the content CT.

In the example of FIGS. 4 and 5, the image display unit 93 is disposed in such a manner as to partition between front-row seats (driver's seat and passenger's seat) and rear-row seats. Cameras CM for monitoring passengers PA on the rear-row seat are installed in the vehicle. The cameras CM function as the in-vehicle sensors 26. In the example of FIG. 4, the two cameras CM monitor the entire in-vehicle space (rear space) behind the front-row seats.

The DMS 30 acquires the viewing state information VS of the passenger PA in the rear space on the basis of images captured by the cameras CM. The viewing state information VS includes, for example, information regarding the number of passengers PA, whether or not the passengers PA are awake, the field of view of the passengers PA, and whether or not the passengers PA are gazing at the content CT. In a case where there is a plurality of passengers PA, it is determined, for each of the passengers PA, the field of view of the passenger PA, whether or not the passenger PA is awake, and whether or not the passenger PA is gazing at the content CT. The HMI 31 controls display of the content CT on the basis of the viewing state information VS.

The image display unit 93 is an optical see-through type or video see-through type display capable of transmitting and displaying the background. In the present disclosure, as an example, an optical see-through type of display is used as the image display unit 93. As the image display unit 93, a known transparent display or technology such as a head-up display (HUD), a transparent organic light emitting diode (OLED), or a transparent light emitting diode (LED) is used. In the present disclosure, as the image display unit 93, for example, a configuration for projecting an image on a transparent screen SCR is adopted.

The image display unit 93 includes, for example, the transparent screen SCR and a projector PJ. The transparent screen SCR includes an optical lens film that reflects light projected from the projector PJ. A dimming film capable of electrically controlling the transmittance of external light is laminated on the optical lens film. The HMI 31 adjusts the display brightness or the transparency or the haze of the image display unit 93 (transparent screen SCR) on the basis of the brightness information outside the vehicle extracted from the environment information CE. When the content CT is not displayed on the image display unit 93, the passengers PA can see the scenery outside the vehicle through the transparent screen SCR from the space between the driver's seat and the passenger's seat.

Figure 6:
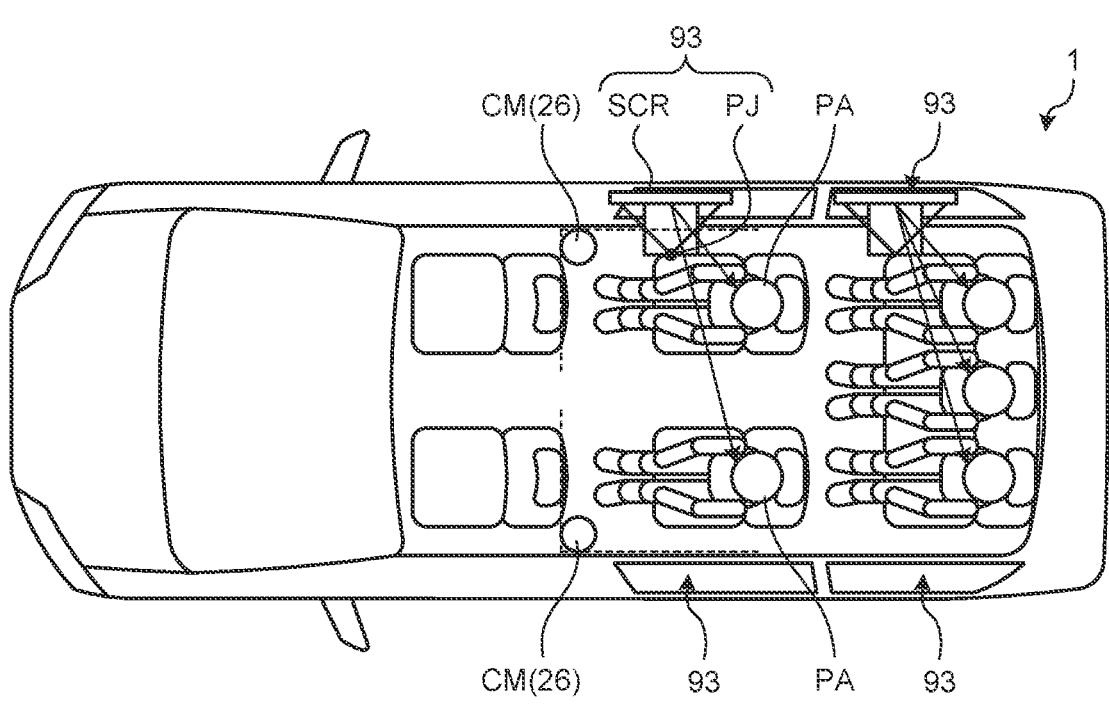
FIG. 6 is a diagram illustrating another configuration example of the image display unit.
Figure 7:
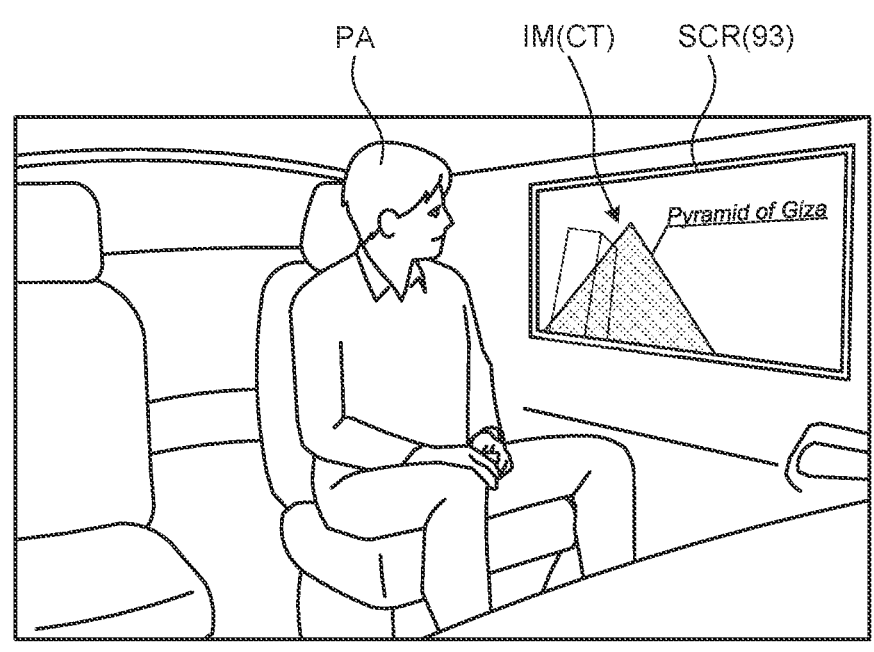
FIG. 7 is a diagram illustrating a display example of an image provided as content.

FIG. 6 is a diagram illustrating another configuration example of the image display unit 93. FIG. 7 is a diagram illustrating a display example of the image IM provided as the content CT.

In the examples of FIGS. 6 and 7, image display units 93 are installed on the sides of passengers PA in rear-row seats. A side glass of the vehicle 1 is replaced with a transparent screen SCR. Instead of using the side glass as the transparent screen SCR, a film-like transparent screen may be attached to a surface of the side glass or sandwiched inside the side glass. When the image IM is not displayed, the passengers PA can see the scenery outside the vehicle through transparent screen SCR.

In the examples of FIGS. 6 and 7, the side glasses of the rear seats have the function as the transparent screen SCR; however, those having the function as the transparent screen SCR are not limited to the side glasses of the rear seats. The windshield, the side glasses of the front seats, or the rear glass may have the function as the transparent screen SCR.

5. Display Control of Content Based on Monitoring Result of Inside and Outside of Vehicle

5-1. Monitoring Target

Figure 8:
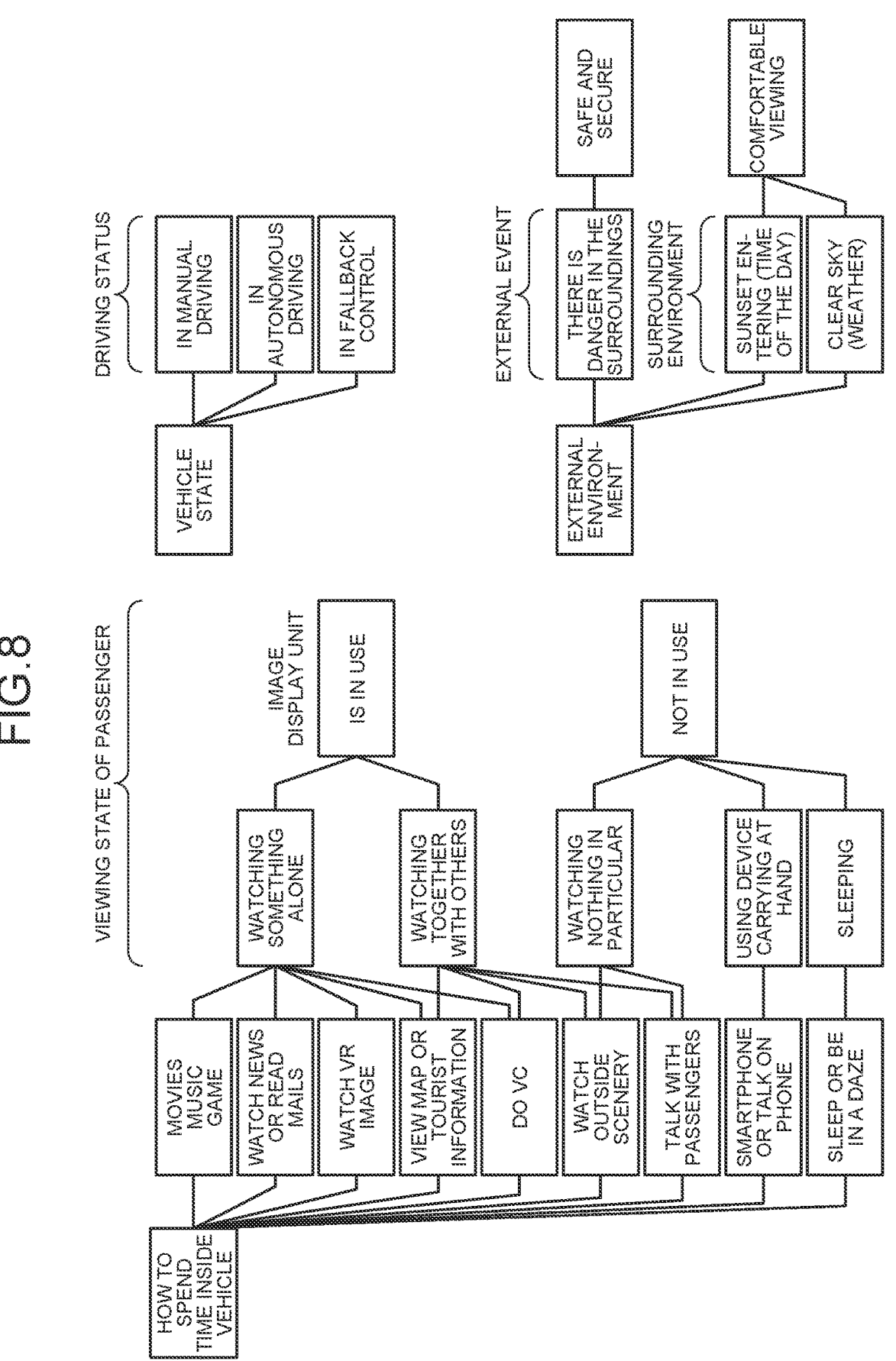
FIG. 8 is a diagram listing states inside and outside a vehicle that can be detected by sensors.

FIG. 8 is a diagram listing states inside and outside the vehicle that can be detected by a sensor.

Ways to spend time in the vehicle include "A1: Movies, music, or game", "A2: Watch news or read mails", "A3: Watch VR image", "A4: View map or tourist information", "A5: Do voice chat (VC)", "A6: Watch outside scenery", "A7: Talk with passengers", "A8: Talk on smartphone", and "A9: Sleep or be in a daze".

A1 to A5 are in a state of "watching something alone", A4 to A7 are in a state of "watching together with others", A6 to A7 are in a state of "watching nothing in particular", A8 is in a state of "using a device carrying at hand", and A9 is in a state of "sleeping". "Watching something alone" and "watching together with others" are states in which the image display unit 93 is being used, and "watching nothing in particular", "using a device carrying at hand", and "sleeping" are states in which the image display unit 93 is not being used. The DMS 30 detects in what mode the passengers PA are using the image display unit 93 as the viewing state.

The state of the vehicle 1 includes "in manual driving", "in autonomous driving", and "in fallback control". "In autonomous driving" or "in manual driving" is a state in which the driving is performed autonomously or manually. "In fallback control" is a state in which the authority is being transferred or requested to be transferred from autonomous driving to manual driving. "In autonomous driving" is a state in which the content CT can be freely enjoyed, and "in manual driving" and "in fallback control" are states in which provision of the content CT should be refrained in order to allow the driver to focus on driving. "In fallback control" can also be said to be a state in which it is necessary for the passengers PA other than the driver to be notified that some abnormality has occurred in the vehicle 1. The vehicle sensor 27 detects the current state of the vehicle 1 among the above-described three states as the driving status DS.

Examples of the external environment include "there is danger in the surroundings", "the sunset entering", and "clear sky". "There is danger in the surroundings" is a state in which there is an event of which the passengers PA is to be notified, and "the sunset entering" and "clear sky" are states in which the brightness control or the like depending on the surrounding environment is required. The recognition unit 73 recognizes the external environment on the basis of the sensor information of the external recognition sensor 25.

The vehicle control system 11 appropriately controls the display of the content CT depending on the viewing state of the passengers PA, the driving status DS, an event outside the vehicle, and the surrounding environment.

5-2. Display Control of Content Depending on Information Transmission Level

Figure 9:
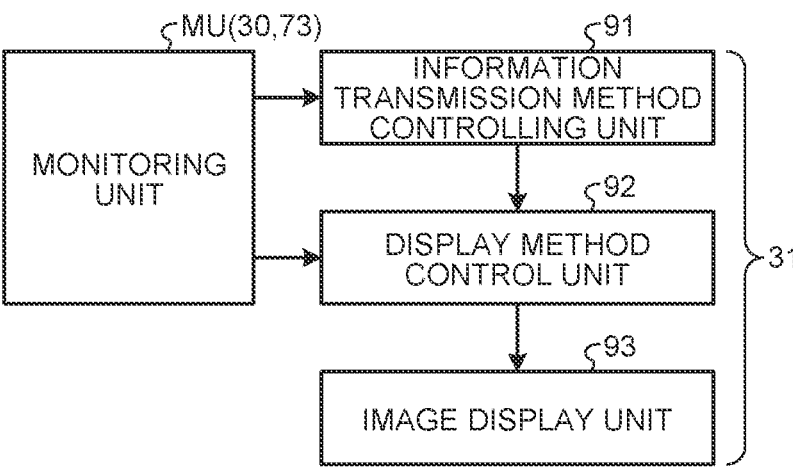
FIG. 9 is a diagram illustrating an example of a display control method of content.

FIG. 9 is a diagram illustrating an example of a display control method of the content CT.

The HMI 31 performs display control of the entertainment content CT on the basis of a monitoring result of the passengers PA. For example, the HMI 31 includes an information transmission method controlling unit 91, a display method control unit 92, and an image display unit 93.

The information transmission method controlling unit 91 determines an information transmission level of an event occurring outside the vehicle on the basis of the monitoring information acquired from the monitoring unit MU. The information transmission level indicates urgency or importance of information transmission for the event occurring outside the vehicle. The information transmission method controlling unit 91 determines a notification method of the event on the basis of the information transmission level. The notification method to be determined is a method of transmitting information regarding the event in a broad sense. The display method control unit 92 determines a detailed display method (display position, display timing, and the like) of various types of information including the content CT depending on the notification method on the basis of the monitoring information.

FIG. 10 is a table illustrating an example of a correspondence relationship among the information transmission level, the surrounding situation, and the display method.

In the example of FIG. 10, five ranks from rank S to rank D are defined as the information transmission levels. The rank S corresponds to a situation where an accident is occurring ahead. In the rank S, viewing of the entertainment content CT that has been displayed ahead is stopped. A field of view outside and ahead of the vehicle is secured, and warning information is displayed in a display area in the front.

The rank A corresponds to a situation where an accident is occurring in the left direction or the right direction of the vehicle 1. In the rank A, a field of view outside the vehicle on a necessary side face side (side where the accident is occurring) is secured. The entertainment content CT displayed in the left or right display area in which the accident is occurring is moved to the display area on the side on which the accident has not occurred. Then, warning information is displayed in the display area on the side where the accident is occurring.

The rank B corresponds to a situation where another vehicle is present at a short distance. In the rank B, a field of view outside the vehicle in a necessary direction (side where the other vehicle is present) is secured. The entertainment content CT is moved to a position (for example, a position that is not superimposed on the other vehicle) where it is not obstructing. Then, warning information is displayed in a display area on a side where the other vehicle is present.

The rank C corresponds to a situation where another vehicle is present at a long distance. In the rank C, a field of view outside the vehicle in a necessary direction (side where the other vehicle is present) is secured. Since the risk of collision with the other vehicle is small, the size of the field of view to be secured is smaller than that of the rank S, the rank A, and the rank B, and no warning information is displayed.

The rank D corresponds to a situation where there is no other vehicle around. In the rank D, there is no event that assumes danger such as collision. Therefore, viewing of the entertainment content CT is continued.

5-3. Processing Flow

Figure 11:
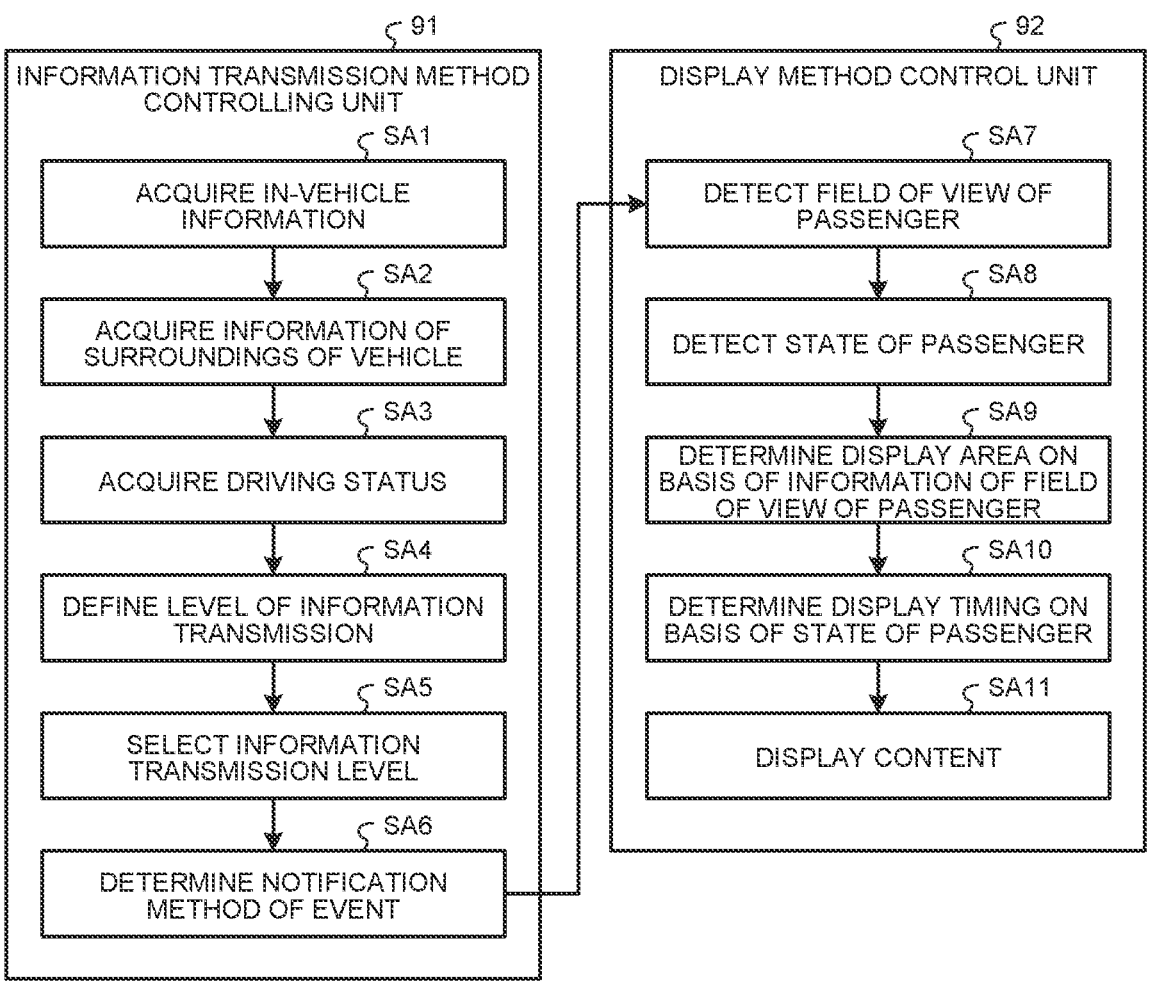
FIG. 11 is a flowchart illustrating an example of display control of content on the basis of results of monitoring inside and outside the vehicle.

FIG. 11 is a flowchart illustrating an example of display control of the content CT on the basis of monitoring results inside and outside the vehicle. FIGS. 12 to 16 are diagrams illustrating details of processing.

As illustrated in FIG. 11, the monitoring unit MU acquires information regarding the inside of the vehicle, information regarding the surroundings of the vehicle, and the driving status DS on the basis of the sensor information (Steps SA1 to SA3). The monitoring unit MU supplies the acquired various types of information to the HMI 31 as monitoring information.

The information inside the vehicle is acquired, for example, in accordance with the flow of FIG. 12. First, the monitoring unit MU checks the number of passengers on the basis of captured images of the cameras CM (Step SB1). The monitoring unit MU checks the activity level of each passenger PA (Step SB2) and determines whether or not all passengers PA are sleeping or one or more passengers PA are awake. In a case where one or more passengers PA are awake, the monitoring unit MU checks the action content (whether or not the passenger PA is watching the content CT) for each passenger PA who is awake (Step SB3).

Information regarding the surroundings of the vehicle is acquired, for example, in accordance with the flow of FIG. 13. First, the monitoring unit MU checks the weather information on the basis of the sensor information acquired from the external recognition sensor 25 and determines whether or not the field of view is good (Step SC1). If the field of view is good, the monitoring unit MU acquires the direction of the sun by using the information of the self-position detected by using the SLAM and time information (Step SC2). In addition, the monitoring unit MU acquires surrounding accident information and information of surrounding vehicles on the basis of the sensor information acquired from the external recognition sensor 25 (Steps SC3 to SC4).

Returning to FIG. 11, the information transmission method controlling unit 91 detects the situation around the vehicle 1 on the basis of the monitoring information. The storage unit 28 stores a table in which definition information of the information transmission levels is defined for each situation. In the table, a correspondence relationship among an information transmission level, a surrounding situation, and a display method is defined as the definition information. The information transmission method controlling unit 91 defines an information transmission level corresponding to the situation on the basis of the table (Step SA4). The information transmission method controlling unit 91 selects an information transmission level corresponding to the surrounding situation and determines a notification method of an event on the basis of the information transmission level that has been selected (Steps SA5 to SA6).

Figure 14:
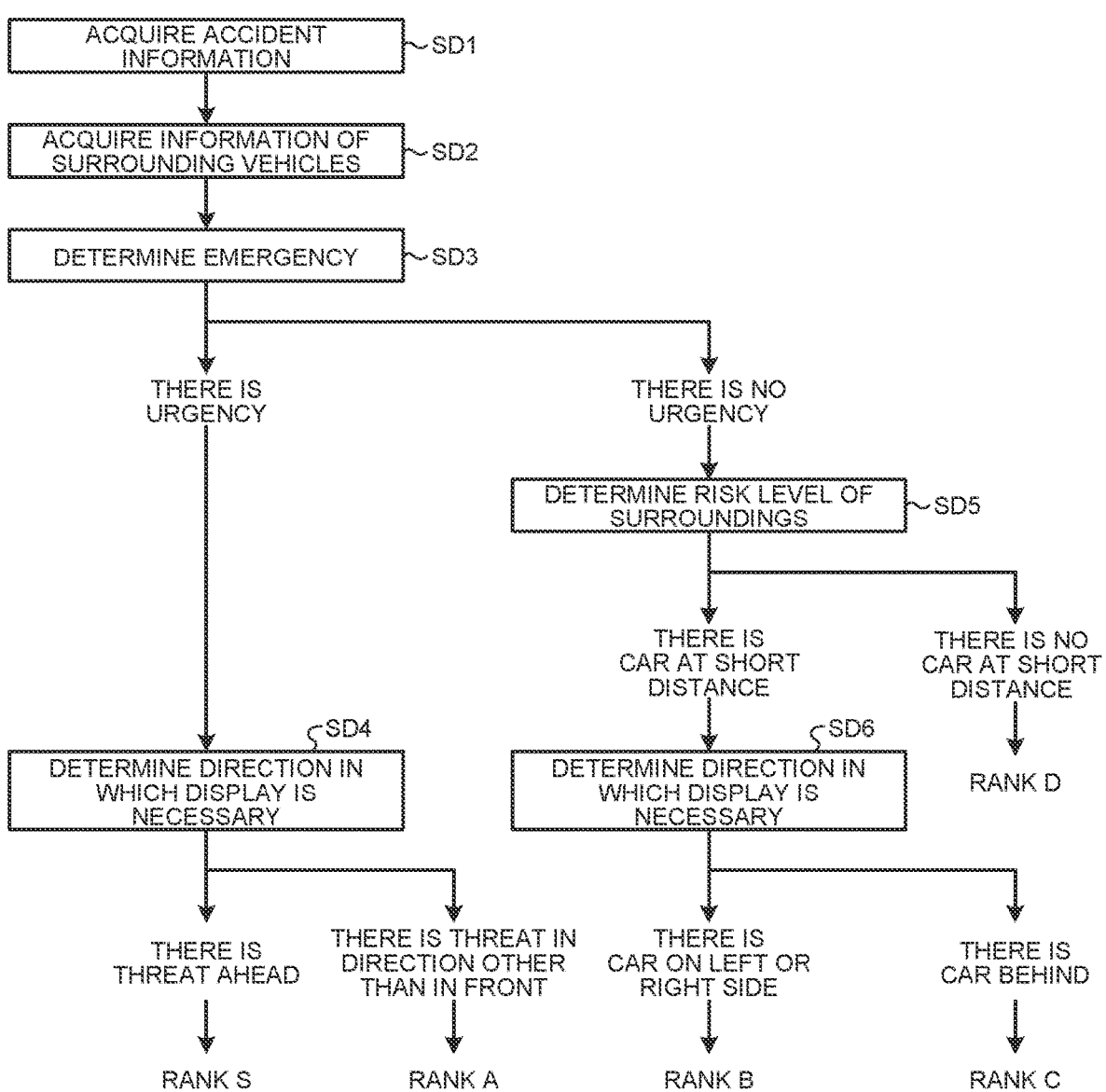
FIG. 14 is a diagram illustrating details of processing.

The information transmission level is determined, for example, in accordance with the flow of FIG. 14. First, the information transmission method controlling unit 91 acquires accident information and information regarding surrounding vehicles from the monitoring unit MU (Steps SD1 to SD2). The information transmission method controlling unit 91 determines the urgency of information transmission regarding the event that has occurred outside the vehicle on the basis of the acquired information (Step SD3).

If it is determined that there is an urgency of information transmission, the information transmission method controlling unit 91 determines a direction in which information regarding the event (for example, a threat to the vehicle 1) needs to be displayed on the basis of the position where the event has occurred (Step SD4). In a case where there is a threat ahead, the information transmission method controlling unit 91 selects the rank S as the information transmission level. In a case where there is a threat in a direction other than in front, the information transmission method controlling unit 91 selects the rank A as the information transmission level.

If it is determined that there is no urgency of information transmission, the information transmission method controlling unit 91 determines a risk level posed by surrounding vehicles (Step SD5). For example, if another vehicle is present nearby, a direction in which display of information regarding the other vehicle is required is determined (Step SD6). If the other vehicle is present in the left direction or the right direction, the information transmission method controlling unit 91 selects the rank B as the information transmission level. If the other vehicle is present behind, the information transmission method controlling unit 91 selects the rank C as the information transmission level. If no other vehicle is present nearby, the information transmission method controlling unit 91 selects the rank D as the information transmission level.

Returning to FIG. 11, the display method control unit 92 detects the viewing state information VS of passengers PA on the basis of the monitoring information (Steps SA7 to SA8). The viewing state information VS includes information related to the field of view of the passengers PA (field of view information) and information related to the states of the passengers PA (state information). The state information includes information regarding whether or not the passengers PA are awake and information regarding whether or not the passengers PA are gazing at the content CT.

The viewing states of the passengers PA are detected, for example, in accordance with the flow of FIG. 15. First, the display method control unit 92 selects all the passengers PA detected on the basis of the monitoring information as detection targets (Step SE1). The display method control unit 92 defines the state of each of the passengers PA on the basis of the monitoring information and determines whether or not each of the passengers PA is gazing at the content CT (Step SE2). For example, in a case where the line of sight is directed to a display area, it is determined that the passenger PA is gazing at the content CT, and in a case where the line of sight is not directed to a display area, it is determined that the passenger PA is not gazing at the content CT.

The display method control unit 92 determines all the passengers PA who are gazing at the content CT as the detection targets (Step SE3). The display method control unit 92 acquires, on the basis of the monitoring information, the field of view information for individual passengers PA who have been determined (Step SE4).

The display method control unit 92 determines a display area of the content CT on the basis of the field of view information of the passengers PA (Step SA9). The display method control unit 92 determines the display timing of the event information and the content CT on the basis of the state information of the passengers PA (Step SA10). A display method is determined by the display area and the display timing. The display method control unit 92 displays the content CT on the basis of the display method that has been determined (Step SA11).

The display method is determined, for example, in accordance with the flow of FIG. 16. First, the display method control unit 92 calculates a display area in which a brightness distribution exceeding a permissible level is generated due to external light (for example, sunlight). The permissible level is set in advance on the basis of the visibility or the like of the content CT. In a case where the visibility decreases below an allowable limit due to the brightness distribution, it is determined that the permissible level has been exceeded. For example, the display method control unit 92 calculates a display area in which the sun is reflected on the basis of the direction of the sun. The display method control unit 92 recognizes the calculated display area as an affected area by external light (Step SF1).

In a case where there is a plurality of passengers PA gazing at the content CT, the display method control unit 92 calculates information (common field of view information) related to a common field of view of the plurality of passengers PA (Step SF2). The common field of view means a portion where the fields of view of the plurality of passengers PA overlap each other on the transparent screen SCR.

If there is a common field of view, the display method control unit 92 switches the display area to correspond to the common field of view (Step SF3). For example, the display method control unit 92 sets the display area of the content CT in an area other than the affected area by the external light and including the common field of view. If there is no common field of view, the display area is switched to correspond to the field of view of a specific passenger PA having a high gaze level (Step SF4). For example, the display method control unit 92 sets the display area of the content CT in an area other than the affected area by the external light and including the field of view of the specific passenger PA. Then, the display method control unit 92 displays the content CT in accordance with the defined rank (Step SF5).

6. Display Control Example

6-1. Notification of Event

Figure 17:
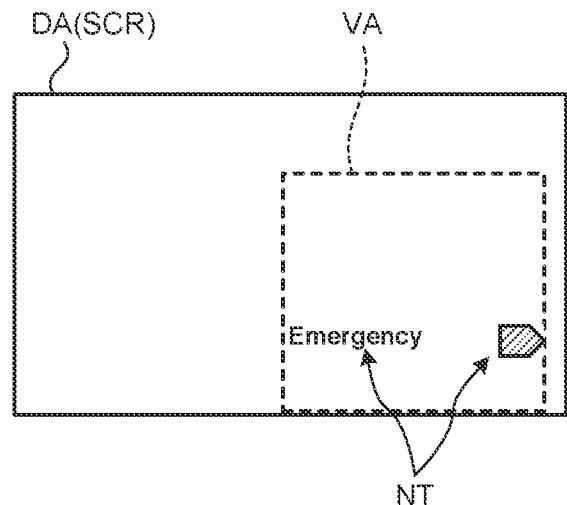
FIG. 17 is a diagram illustrating a notification example of an event.

Hereinafter, an example of display control by the HMI 31 will be described with reference to FIGS. 17 to 28. FIG. 17 is a diagram illustrating a notification example of an event.

In a case where an event of which a passenger PA is to be notified occurs outside the vehicle, the HMI 31 performs an event notification NT in a display area of a portion superimposed on a field of view VA of the passenger PA at timing when the event has occurred outside the vehicle. As events of which the passenger PA is to be notified, an accident that poses a threat to the safety of the host vehicle and the presence of another vehicle that is performing dangerous driving are conceivable.

For example, the HMI 31 displays the event information ET on the image display unit 93 to perform the event notification NT. The event information ET includes, for example, information such as the type of the event and the occurrence position of the event. In the example of FIG. 17, a message "Emergency" is displayed at the lower left of the field of view VA of the passenger PA and an arrow indicating a direction from which another vehicle is approaching is displayed at the lower right of the field of view VA at timing when the other vehicle has approached the host vehicle by a predetermined distance. "Emergency" indicates the type of the event, and an arrow indicates the occurrence position of the event.

The event notification NT is performed in the display area of the portion superimposed on the field of view VA of the passenger PA in the entire display area (displayable area DA) of the image display unit 93. Therefore, the passenger PA can acquire the event information ET without moving the field of view VA while watching the content CT.

6-2. Transparent Display of Event

Figure 18:
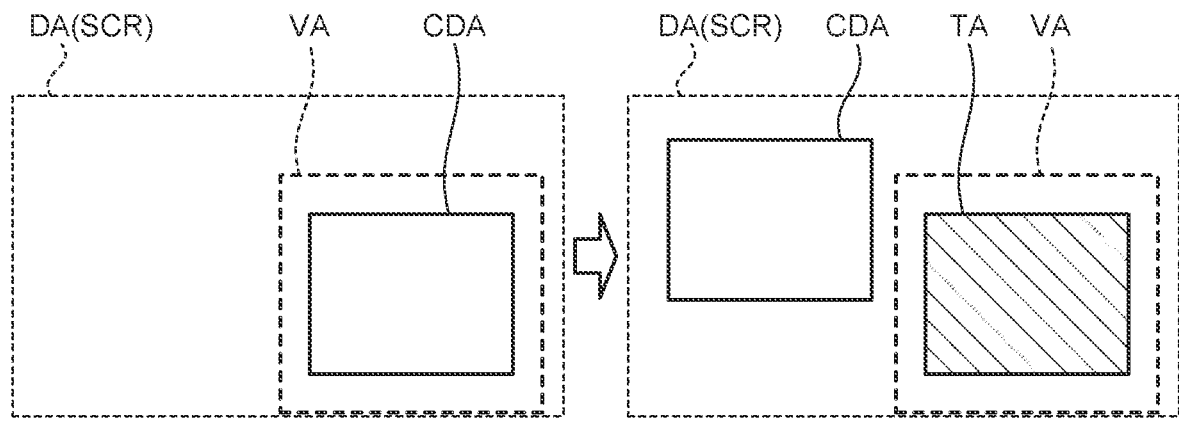
FIG. 18 is a diagram illustrating a transparent display example of an event.

FIG. 18 is a diagram illustrating a transparent display example of an event.

The HMI 31 brings the display area of the portion superimposed on the field of view VA of the passenger PA into the transparent state at timing when the event occurring outside the vehicle is confirmed in the field of view VA of the passenger PA. According to this configuration, the situation of the event can be visually recognized through the display area (transparent area TA) in the transparent state without moving the field of view VA.

For example, the HMI 31 moves the display position of the content CT displayed in the display area of the portion superimposed on the field of view VA or stops display of the display area of the portion superimposed on the field of view VA. As a result, the HMI 31 brings the display area of the portion superimposed on the field of view VA to the transparent state.

In the example of FIG. 18, the display area (content display area CDA) of the content CT is moved from the lower right position of the screen superimposed on the field of view VA to an upper left position of the screen not superimposed on the field of view VA. A lower right area of the screen on which the content CT has been displayed becomes a transparent area TA. The passenger PA can visually recognize the situation of the event outside the vehicle through the transparent area TA. According to this configuration, the continuity of the content CT before and after the event is displayed is maintained. Therefore, the passenger PA who views the content CT is less likely to feel uncomfortable. That is, since the passenger PA can visually recognize the event outside the vehicle and grasp the situation, if it can be determined that there is no major problem, the passenger PA can continue to view the content CT. The vehicle control system 11 may have a means by which a user notifies the HMI 31 of the determination as to whether or not there is a problem.

6-3. Control of Content Display Position Based on Brightness Distribution

Figure 19:
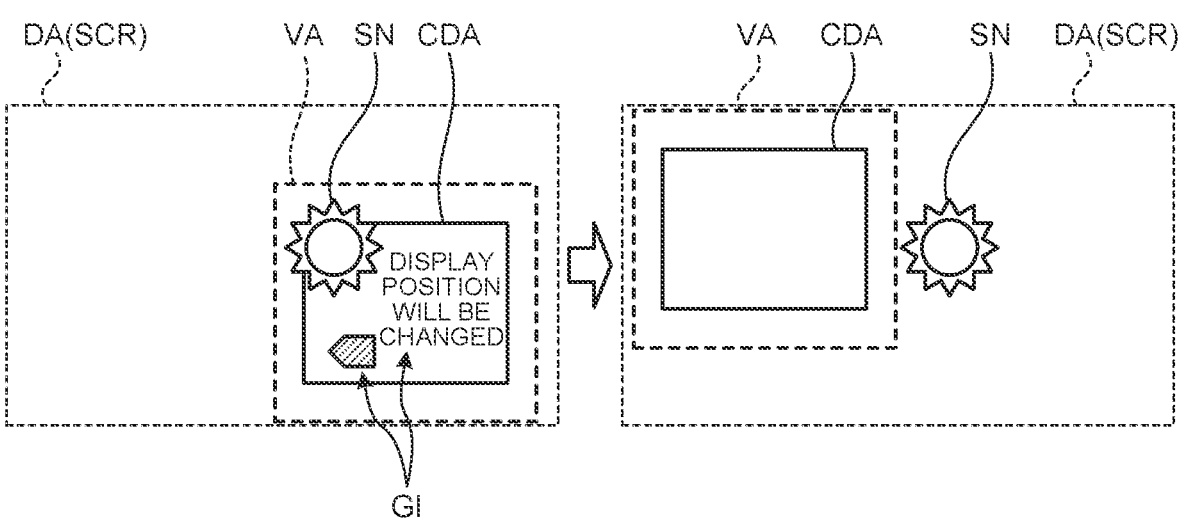
FIG. 19 is a diagram illustrating a control example of a content display position on the basis of a brightness distribution.
Figure 20:
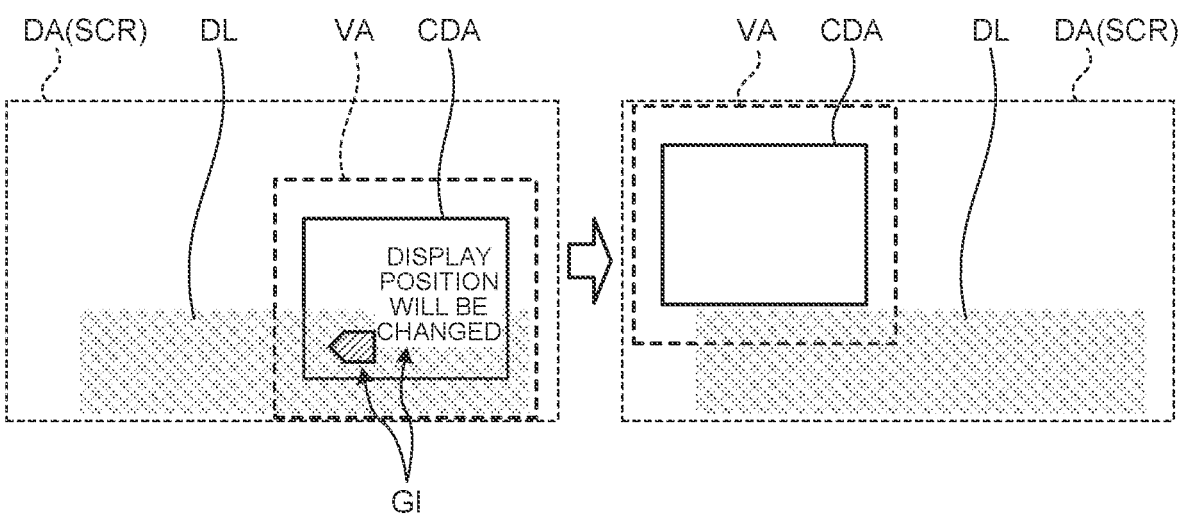
FIG. 20 is a diagram illustrating a control example of a content display position on the basis of a brightness distribution.

FIGS. 19 and 20 are diagrams illustrating a control example of a content display position based on the brightness distribution.

The HMI 31 moves the display position of the content CT to another display area in which the brightness distribution satisfies the permissible level when a brightness distribution exceeding the permissible level is generated in the content display area CDA by external light. For example, in a case where a ratio of the brightness between the brightest portion and the darkest portion in the content display area CDA is larger than a preset threshold value, the HMI 31 determines that the brightness distribution exceeds the permissible level.

In the example of FIG. 19, with the sun SN reflected in the content display area CDA, a brightness distribution exceeding the permissible level is generated in the content display area CDA. Therefore, the HMI 31 moves the content display area CDA to avoid reflection of the sun SN. As a result, a decrease in the visibility of the content CT due to external light is suppressed.

When moving the display position of the content CT to another display area, the HMI 31 displays guidance information GI for guiding the line of sight of the passenger PA to the other display area. In the example of FIG. 19, as the guidance information FI, together with a message "Display position will be changed", an arrow indicating a destination of the content display area CDA is displayed at the lower left of the content display area CDA. With the guidance information GI, the passenger PA grasps in advance that the content display area CDA is moved and the direction in which the content display area CDA is moved. Therefore, the display position of the content CT can be moved without giving discomfort to the passenger PA.

In the example of FIG. 20, with external light being directly incident on a part of the content display area CDA, a brightness distribution exceeding the permissible level is generated in the content display area CDA. In a case where a direct incident area DL of external light is significantly bright as compared with other areas (shadowed areas), the brightness distribution is not sufficiently eliminated even when the transparency and the haze of the transparent screen SCR are adjusted. Therefore, after performing the notification by the guidance information GI, the HMI 31 moves the content display area CDA to a position avoiding the direct incident area DL.

Illustrated in FIGS. 19 and 20 is the example in which the brightness distribution is generated in the content display area CDA by the sunlight; however, the brightness distribution may be generated by external light other than the sunlight. For example, a brightness distribution may be generated in the content display area CDA due to a street light, lights of a town in a night scene, or others. Also in this case, the HMI 31 moves the content display area CDA to an area having small brightness distribution.

6-4. Control of Notification Method of Event Based on Information Transmission Level FIG. 21 is a diagram illustrating a control example of the notification method of an event based on the information transmission level. Note that it is based on the premise that the passengers PA use the image display unit 93 in the center of the vehicle illustrated in FIG. 4.

The HMI 31 determines the notification method of an event on the basis of the urgency or the importance of information transmission regarding an event that has occurred outside the vehicle. For example, in the example of the upper part of FIG. 21, there is no other vehicle OT around a host vehicle OW. Therefore, the HMI 31 determines that no event of which the passenger PA is to be notified is occurring and does not provide notification of the event.

In the example of a middle part of FIG. 21, another vehicle OT is present at a position slightly away on the right rear side of the host vehicle OW. The HMI 31 determines that a less urgent event has occurred on the right rear side of the host vehicle OW. The HMI 31 lights up the right end of the content CT to match with a direction in which the event has occurred. As a result, the event notification NT is performed.

The level of urgency is represented by the intensity of light. The HMI 31 changes the intensity of light depending on the distance between the host vehicle OW and the other vehicle OT. The shorter the distance is, the more urgent and the higher the intensity of the light is. In the example in the middle part of FIG. 21, the distance between the host vehicle OW and the other vehicle OT is relatively large. Therefore, the intensity of the light illuminating the right end of the content CT is relatively small.

In the example of a lower part of FIG. 21, the other vehicle OT travels close to the right side of the host vehicle OW. The HMI 31 determines that a highly urgent event has occurred on the right side of the host vehicle OW. The HMI 31 performs the event notification NT by strongly illuminating the right end of the content CT.

6-5. Control of Content Display Position Based on Occurrence Position of Event FIG. 22 is a diagram illustrating a control example of the content display position based on the occurrence position of an event. Note that it is based on the premise that the passengers PA use the image display unit 93 in the center of the vehicle illustrated in FIG. 4.

The HMI 31 controls the display position of the content CT on the basis of the occurrence position of the event. For example, in the example of the upper part of FIG. 22, there is no other vehicle OT around the host vehicle OW. Therefore, the HMI 31 determines that no event of which the passenger PA is to be notified is occurring and does not change the display position of the content CT.

In the example of the middle part of FIG. 22, an accident (event) has occurred ahead of the host vehicle OW. The HMI 31 reduces the display size of the content CT in such a manner that a field of view in front is secured. The HMI 31 disposes the reduced content CT at a position (for example, the lower end of the transparent screen SCR) not overlapping the line of sight of the passenger PA so as not to obstruct the passenger PA from looking at an accident site AS.

In the example of the lower part of FIG. 22, an accident has occurred on the right side of the host vehicle OW. The HMI 31 reduces the display size of the content CT in such a manner that the field of view on the right side is secured. The HMI 31 disposes the reduced content CT at a position (for example, the left end of the transparent screen SCR) not overlapping the line of sight of the passenger PA so as not to obstruct the passenger PA from looking at an accident site AS.

Figure 23:
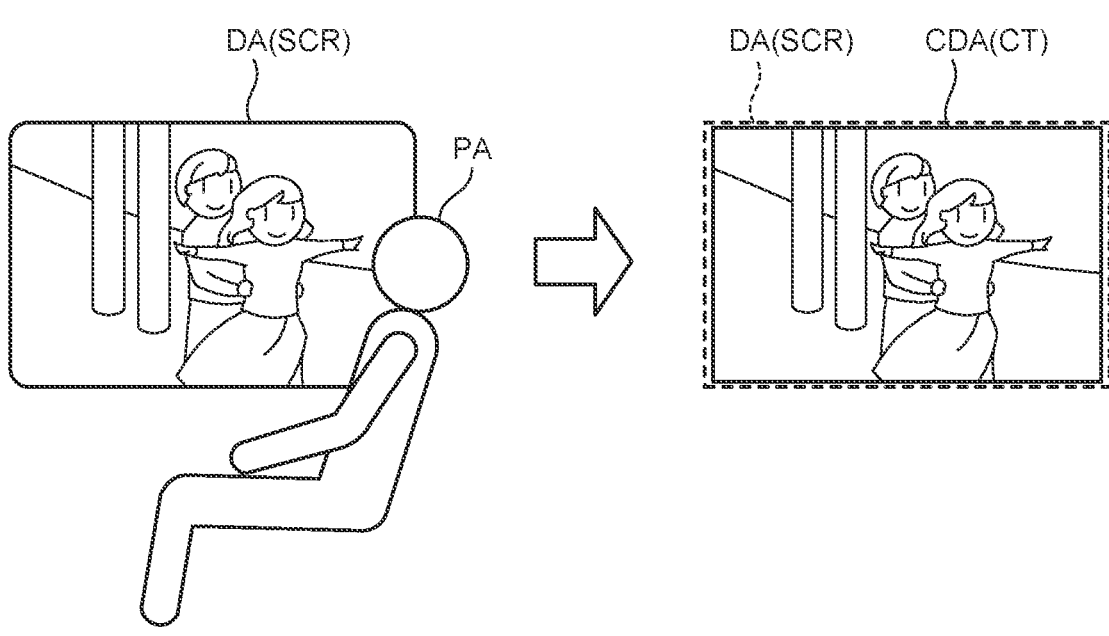
FIG. 23 is a diagram illustrating a control example of a content display position based on a viewing state of a passenger.
Figure 24:
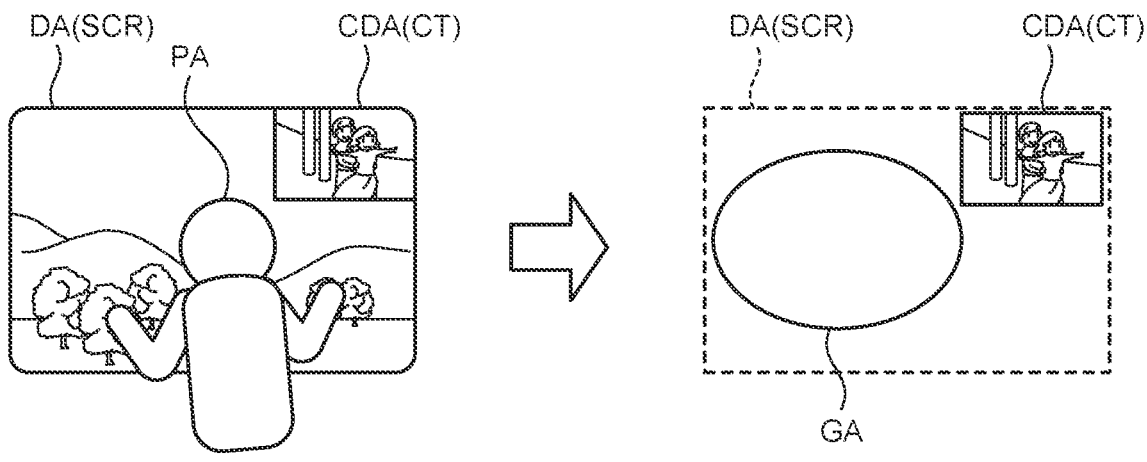
FIG. 24 is a diagram illustrating a control example of a content display position based on a viewing state of a passenger.

6-6. Control of Content Display Position Based on Viewing State of Passenger FIGS. 23 and 24 are diagrams illustrating a control example of the content display position based on a viewing state of a passenger PA. It is based on the premise that the passenger PA uses an image display unit 93 of a vehicle side face portion illustrated in FIG. 6.

In the example of FIG. 23, the passenger PA leans back and views the content CT. The HMI 31 detects a state in which the passenger PA is gazing at the content CT on the basis of the viewing state information VS. The HMI 31 displays the content CT on the entire transparent screen SCR so that the passenger PA can view the content CT on the large screen.

In the example of FIG. 24, the passenger PA brings the face close to the transparent screen SCR and is looking at a scenery GA outside the vehicle. The HMI 31 detects a state in which the passenger PA intends to view the scenery GA outside the vehicle on the basis of the viewing state information VS. The HMI 31 reduces the display size of the content CT in such a manner that a field of view on a side is secured. The HMI 31 disposes the reduced content CT at a position (for example, a corner of the transparent screen SCR) not overlapping the line of sight of the passenger PA so as not to obstruct the passenger PA from looking at the scenery GA.

6-7. Display Control Based on Viewing States of Plurality of Passengers

FIGS. 25 to 28 are diagrams illustrating a display control example based on viewing states of a plurality of passengers PA. In FIGS. 25 to 28, the individual passengers PA are distinguished by a number attached after the symbol as necessary. The field of view VA of the individual passengers PA is also distinguished in a similar manner.

The HMI 31 detects the field of view VA of one or more passengers PA gazing at the content CT on the basis of the viewing state information VS. The HMI 31 displays the content CT in a display area of a portion superimposed on the field of view VA for each detected field of view VA.

Figure 25:
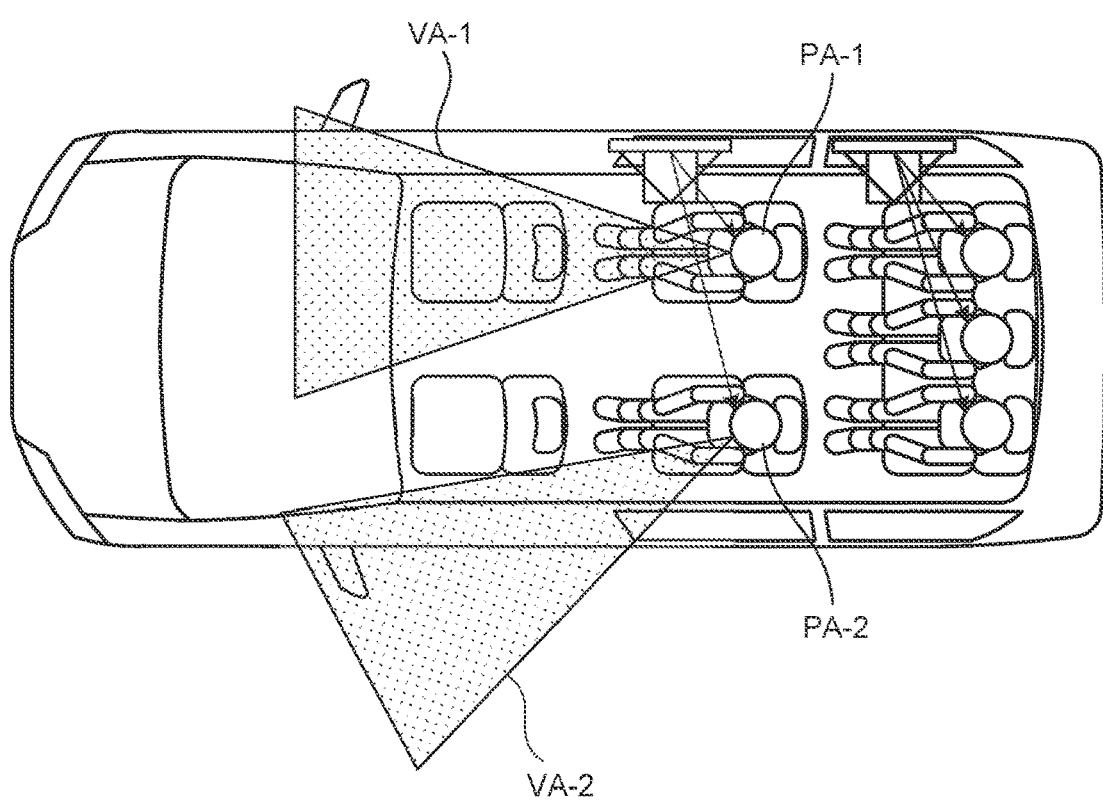
FIG. 25 is a diagram illustrating a display control example based on viewing states of a plurality of passengers.
Figure 26:
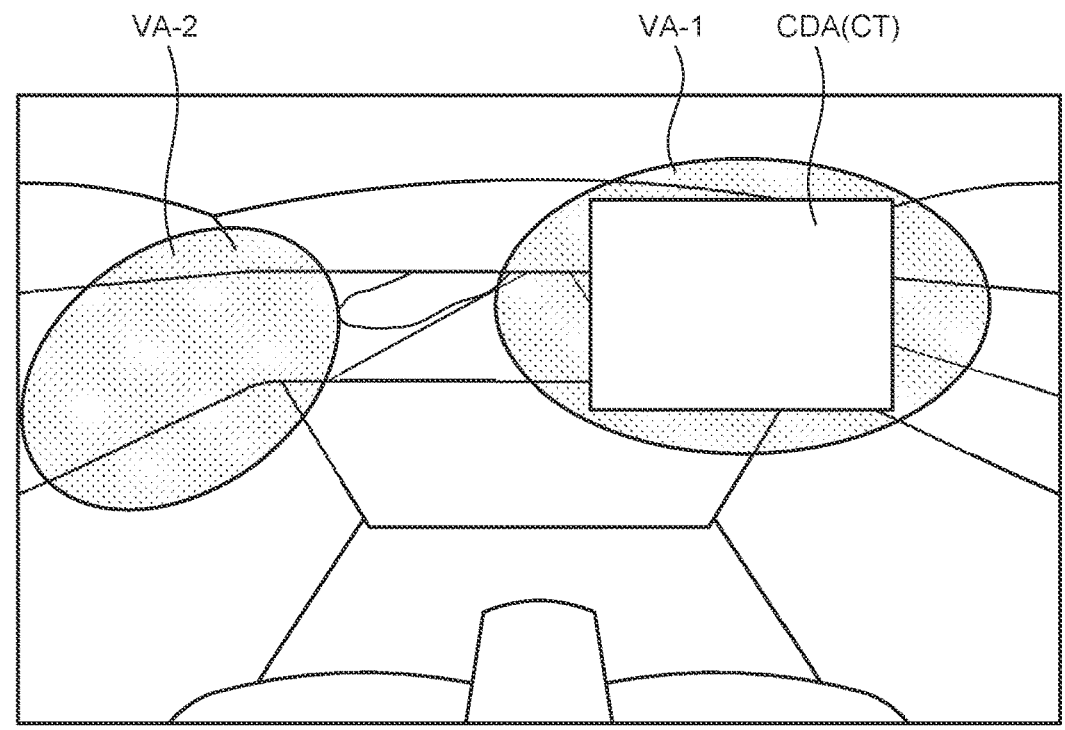
FIG. 26 is a diagram illustrating a display control example based on viewing states of a plurality of passengers.

In the example of FIGS. 25 and 26, a passenger PA-2 is looking at a scenery outside the vehicle. Therefore, the HMI 31 selectively displays the content CT in a display area of a portion superimposed on a field of view VA-1 of a passenger PA-1. The HMI 31 brings a display area of a portion superimposed on a field of view VA-2 of the passenger PA-2 into the transparent state so that the passenger PA-2 can see the outside of the vehicle therethrough.

When detecting that a passenger PA has started driving on the basis of a monitoring result of the inside of the vehicle, the HMI 31 stops the display of the entertainment content CT gazed at by the passenger PA who has started driving. According to this configuration, the passenger PA can be caused to focus on driving, and thus the safety of driving is enhanced. Note that the fact that manual driving has been initiated is detected on the basis of the driving status DS. Which passenger PA has started driving is specified by image analysis of images of cameras installed in the vehicle.

Figure 27:
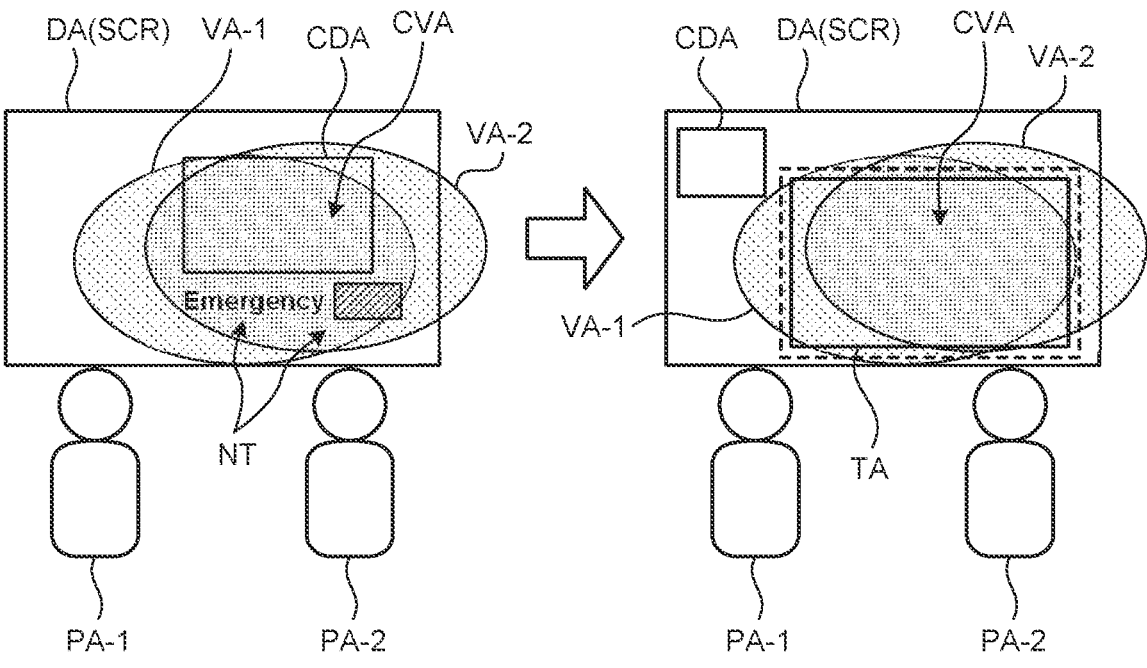
FIG. 27 is a diagram illustrating a display control example based on viewing states of a plurality of passengers.
Figure 28:
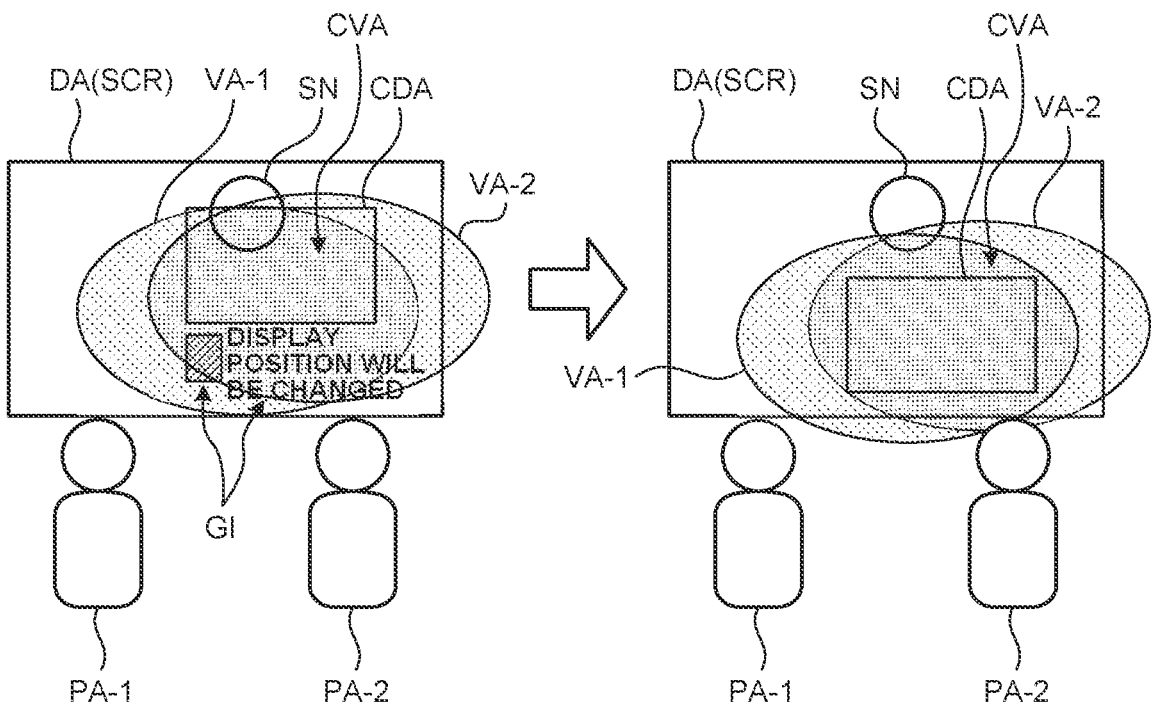
FIG. 28 is a diagram illustrating a display control example based on viewing states of a plurality of passengers.

FIGS. 27 and 28 are diagrams illustrating an example of display control based on a common field of view CVA of a plurality of passengers PA.

In a case where there is a common field of view CVA among the fields of view VA of the plurality of passengers PA, the HMI 31 performs display control of the event information ET and others on the basis of the position of the common field of view CVA.

For example, in the example of FIG. 27, the plurality of passengers PA view the same content CT. The common field of view CVA is present on the content CT. At this point, in a case where approach of another vehicle OT (event) is detected, the HMI 31 performs notification NT for providing notification of the approach of the other vehicle OT in a display area of a portion superimposed on the common field of view CVA. When the other vehicle OT reaches the position superimposed on the common field of view CVA, the HMI 31 moves the content display area CDA to a position not superimposed on the common field of view CVA and brings the display area of the portion superimposed on the common field of view CVA to the transparent state.

In the example of FIG. 28, the content display area CDA is moved in order to avoid reflection of the sun SN. When moving the display position of the content CT to another display area, the HMI 31 displays the guidance information GI in the display area of the portion superimposed on the common field of view CVA. As a result, all the passengers PA who view the common content CT can be caused to recognize that the content display area CDA moves and the moving direction of the content display area CDA.

7. Effects

The vehicle control system 11 includes the HMI 31. The HMI 31 performs display control of the entertainment content CT on the basis of a monitoring result of the passengers PA. In a vehicle control method of the present disclosure, the processing of the vehicle control system 11 is executed by a computer. A program of the present disclosure causes a computer to implement the processing of the vehicle control system 11.

According to this configuration, it is possible to perform display control in consideration of the viewing states of the passengers PA. Therefore, the convenience of the passengers PA for enjoying the content CT is enhanced.

The content CT is displayed by the image display unit 93. The image display unit 93 can switch between a display state and a transparent state. The HMI 31 adjusts the display brightness or the transparency or the haze of a display area (transparent screen SCR) of the content CT on the basis of brightness information outside the vehicle.

According to this configuration, the image display unit 93 can have a content display function and a window function. It is also possible to perform AR display by superimposing the image IM over the scenery outside the vehicle. In addition, the visibility of the content CT is enhanced by adjusting the brightness of the display and the transparency or the haze of the display area of the content CT depending on the brightness outside the vehicle.

The HMI 31 determines the notification method of an event on the basis of the urgency or the importance of information transmission regarding an event that has occurred outside the vehicle.

According to this configuration, it is possible to recognize the presence of an event that has occurred outside the vehicle and the urgency or the importance of the event while enjoying the content CT.

The vehicle control system 11 includes the monitoring unit MU. The monitoring unit MU records the display position of the content CT and the gaze situation of the passengers PA with respect to the content CT.

According to this configuration, it is easier to investigate the cause of the accident when an accident occurs.

Note that the effects described herein are merely examples and are not limiting, and other effects may also be achieved.

APPENDIX

Note that the present technology can also have the following configurations.

(1)

A vehicle control system comprising a human-machine interface that performs display control of entertainment content on a basis of a monitoring result of a passenger.

(2)

The vehicle control system according to (1), wherein the human-machine interface determines a notification method of an event having occurred outside a vehicle on a basis of urgency or importance of information transmission regarding the event.

(3)

The vehicle control system according to (1) or (2), wherein the human-machine interface provides notification of an event in a display area of a portion superimposed on a field of view of the passenger at timing when the event has occurred outside a vehicle.

(4)

The vehicle control system according to any one of (1) to (3), wherein the human-machine interface brings a display area of a portion superimposed on a field of view of the passenger into a transparent state at timing when an event having occurred outside a vehicle is confirmed in the field of view of the passenger.

(5)

The vehicle control system according to (4), wherein the human-machine interface brings the display area into the transparent state by moving a display position of the content displayed in the display area or stopping display of the display area.

(6)

The vehicle control system according to any one of (1) to (5), wherein the human-machine interface moves a display position of the content to a second display area in which the brightness distribution satisfies the permissible level when a brightness distribution exceeding a permissible level is generated in a display area of the content by external light.

(7)

The vehicle control system according to (6), wherein the human-machine interface displays guidance information for guiding a line of sight of the passenger to the second display area when the display position of the content is moved to the second display area.

(8)

The vehicle control system according to any one of (1) to (7),

wherein the human-machine interface stops display of the content gazed at by the passenger who has started driving.

(9)

The vehicle control system according to any one of (1) to (8), further comprising:
a monitoring unit that records a display position of the content and a gaze situation of the passenger with respect to the content.

(10)

The vehicle control system according to any one of (1) to (9),
wherein the human-machine interface adjusts brightness of display or transparency or haze of a display area of the content on a basis of brightness information outside a vehicle.

(11)

A vehicle control method executed by a computer, the vehicle control method comprising the step of performing display control of entertainment content on a basis of a monitoring result of a passenger.

(12)

A program for causing a computer to implement display control of entertainment content on a basis of a monitoring result of a passenger.

REFERENCE SIGNS LIST

11 VEHICLE CONTROL SYSTEM
31 HUMAN-MACHINE INTERFACE (HMI)
93 IMAGE DISPLAY UNIT
CT CONTENT
GI GUIDANCE INFORMATION
MU MONITORING UNIT
PA PASSENGER
VA FIELD OF VIEW

The invention claimed is:

1. A vehicle control system, comprising:
a human-machine interface configured to:
determine an occurrence of an event outside a vehicle, wherein the occurrence of the event is in a field of view of a passenger of the vehicle;
perform display control of entertainment content in the vehicle based on the determined occurrence of the event; and
change a first display area of a portion of the vehicle into a transparent state based on the performed display control of the entertainment content, wherein the portion is in superimposition on the field of view of the passenger.

2. The vehicle control system according to claim 1, wherein the human-machine interface is further configured to:
determine a notification process of the event, based on at least one of an urgency of information transmission or an importance of the information transmission, wherein the information transmission is associated with the event.

3. The vehicle control system according to claim 1, wherein
the human-machine interface is further configured to provide a notification of the event in the first display area of the portion based on the determined occurrence of the event.

4. The vehicle control system according to claim 1, wherein the human-machine interface is further configured to:

perform one of a movement of a display position of the entertainment content or a stop of display of the first display area, wherein the entertainment content is in the first display area; and
change the first display area into the transparent state based on the performed one of the movement of the display position or the stop of the display of the first display area.

5. The vehicle control system according to claim 1, wherein the human-machine interface is further configured to:
determine a first brightness distribution in the first display area, wherein
the determined first brightness distribution is greater than a permissible level, and
the first brightness distribution is associated with external light; and
move a display position of the entertainment content from the first display area to a second display area, wherein
the display position of the entertainment content is moved based on the determined first brightness distribution, and
a second brightness distribution in the second display area is within the permissible level.

6. The vehicle control system according to claim 5, wherein
the human-machine interface is further configured to display guidance information to guide a line of sight of the passenger from the first display area to the second display area, and
the guidance information is displayed based on the movement of the display position of the entertainment content.

7. The vehicle control system according to claim 1, wherein the human-machine interface is further configured to:
determine a driving state of the passenger; and
stop display of the entertainment content based on the determined driving state of the passenger, wherein the entertainment content is within a line of sight of the passenger.

8. The vehicle control system according to claim 1, further comprising circuitry configured to:
record a display position of the entertainment content; and
record a gaze situation of the passenger, wherein the gaze situation of the passenger is associated with the entertainment content.

9. The vehicle control system according to claim 1, wherein the human-machine interface is further configured to adjust, based on brightness information outside the vehicle, one of a brightness of the first display area, a transparency of the first display area, or a haze of the first display area.

10. A vehicle control method, comprising:
determining an occurrence of an event outside a vehicle, wherein the occurrence of the event is in a field of view of a passenger of the vehicle;
performing display control of entertainment content in the vehicle based on the determined occurrence of the event; and
changing a display area of a portion of the vehicle into a transparent state based on the performed display control of the entertainment content, wherein the portion is in superimposition on the field of view of the passenger.

11. A non-transitory computer-readable medium having stored thereon computer-executable instructions, that when executed by a computer, cause the computer to execute operations, the operations comprising:

determining an occurrence of an event outside a vehicle, wherein the occurrence of the event is in a field of view of a passenger of the vehicle;

performing display control of entertainment content in the vehicle based on the determined occurrence of the event; and changing a display area of a portion of the vehicle into a transparent state based on the performed display control of the entertainment content, wherein the portion is in superimposition on the field of view of the passenger.

* * * * *